(12) United States Patent
Park et al.

(10) Patent No.: US 10,812,167 B2
(45) Date of Patent: Oct. 20, 2020

(54) METHOD FOR OPERATING VERY HIGH FREQUENCY BASED ACCESS NETWORK, AND APPARATUS FOR THE SAME

(71) Applicant: Electronics and Telecommunications Research Institute, Daejeon (KR)

(72) Inventors: Soon Gi Park, Daejeon (KR); Jun Sik Kim, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 16/684,336

(22) Filed: Nov. 14, 2019

(65) Prior Publication Data

US 2020/0162147 A1  May 21, 2020

(30) Foreign Application Priority Data

Nov. 16, 2018 (KR) .................. 10-2018-0141975
Oct. 10, 2019 (KR) .................. 10-2019-0125627

(51) Int. Cl.
| | | |
|---|---|---|
| *H04K 1/10* | (2006.01) | |
| *H04L 27/28* | (2006.01) | |
| *H04B 7/06* | (2006.01) | |
| *H04W 16/28* | (2009.01) | |
| *H04W 88/08* | (2009.01) | |

(52) U.S. Cl.
CPC .......... *H04B 7/0691* (2013.01); *H04W 16/28* (2013.01); *H04W 88/085* (2013.01)

(58) Field of Classification Search
CPC .. H04B 7/0691; H04W 16/28; H04W 88/085; H01Q 1/246; H01Q 9/0435
USPC .................. 375/260, 219, 220, 295, 316
See application file for complete search history.

(56) References Cited

U.S. PATENT DOCUMENTS

| | | | |
|---|---|---|---|
| 7,596,387 B2 | 9/2009 | Goldberg et al. | |
| 8,831,654 B2 | 9/2014 | Kim et al. | |
| 9,078,141 B2 | 7/2015 | Hwang | |
| 10,039,012 B2 | 7/2018 | Kim | |
| 2001/0004604 A1* | 6/2001 | Toshimitsu | H04W 16/32 |
| | | | 455/562.1 |
| 2017/0339575 A1 | 11/2017 | Kim et al. | |
| 2018/0049274 A1 | 2/2018 | Kim et al. | |
| 2018/0090853 A1* | 3/2018 | Sihlbom | H01Q 9/0435 |
| 2018/0254818 A1 | 9/2018 | Song et al. | |

* cited by examiner

*Primary Examiner* — Phuong Phu
(74) *Attorney, Agent, or Firm* — William Park & Associates Ltd.

(57) ABSTRACT

A method for operating cells, performed by a central unit (CU) using at least one antenna assembly arranged around a moving path of moving objects, may comprise forming a cell for each of at least two layers by using the at least one antenna assembly; and moving the cell at a speed configured for a layer corresponding to the cell, wherein the cell is connected to a moving object having a speed corresponding to the speed configured for the layer corresponding to the cell.

20 Claims, 40 Drawing Sheets

FIG. 4
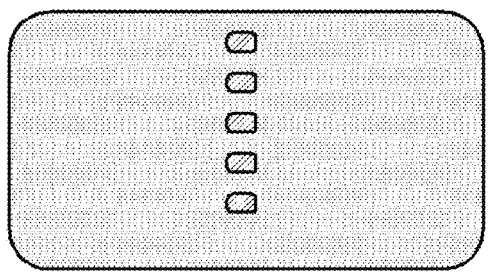
1D(Line) weight/phase control
- Discrete
1D(Line) weight/phase control
- Continuous
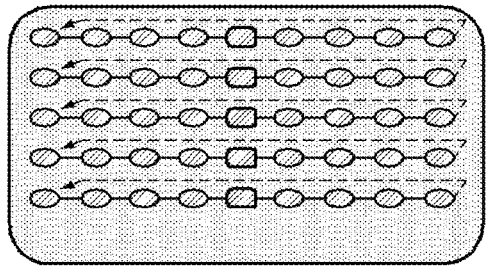
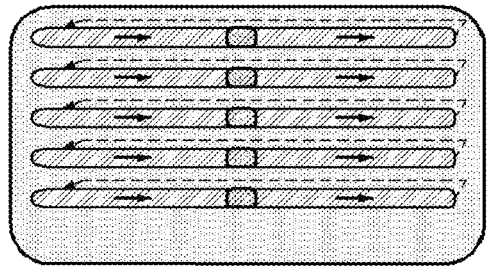

FIG. 17
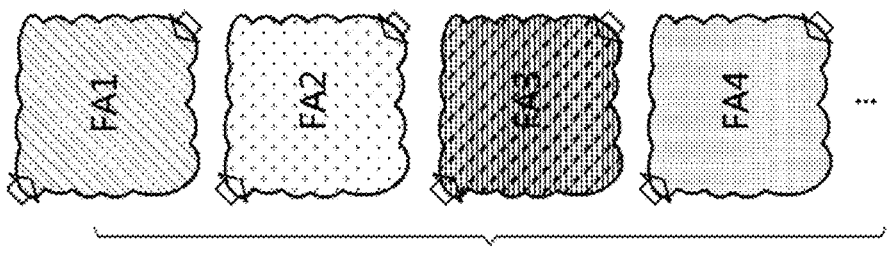
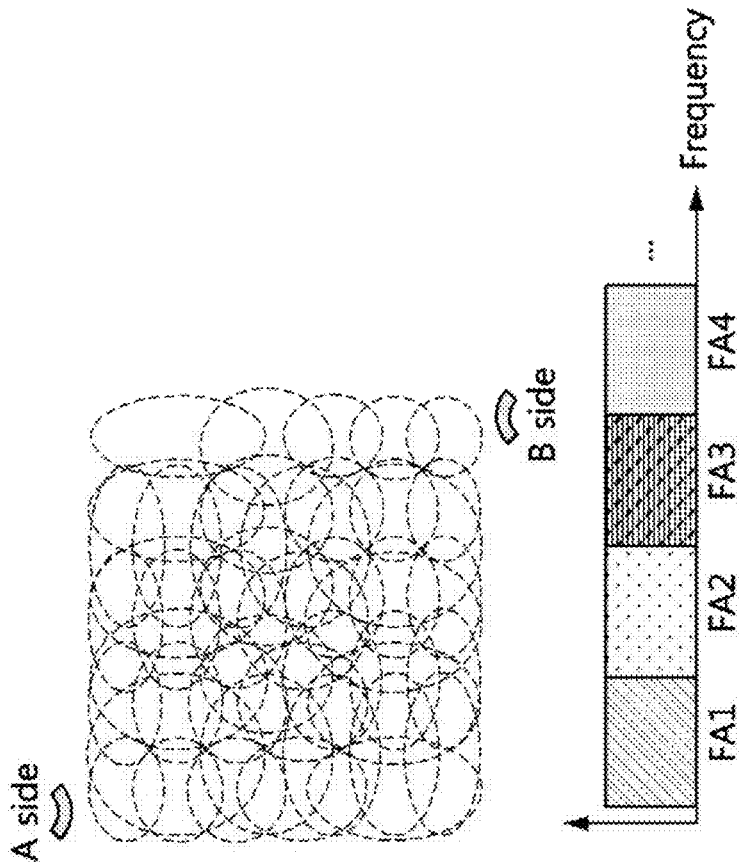

FIG. 20
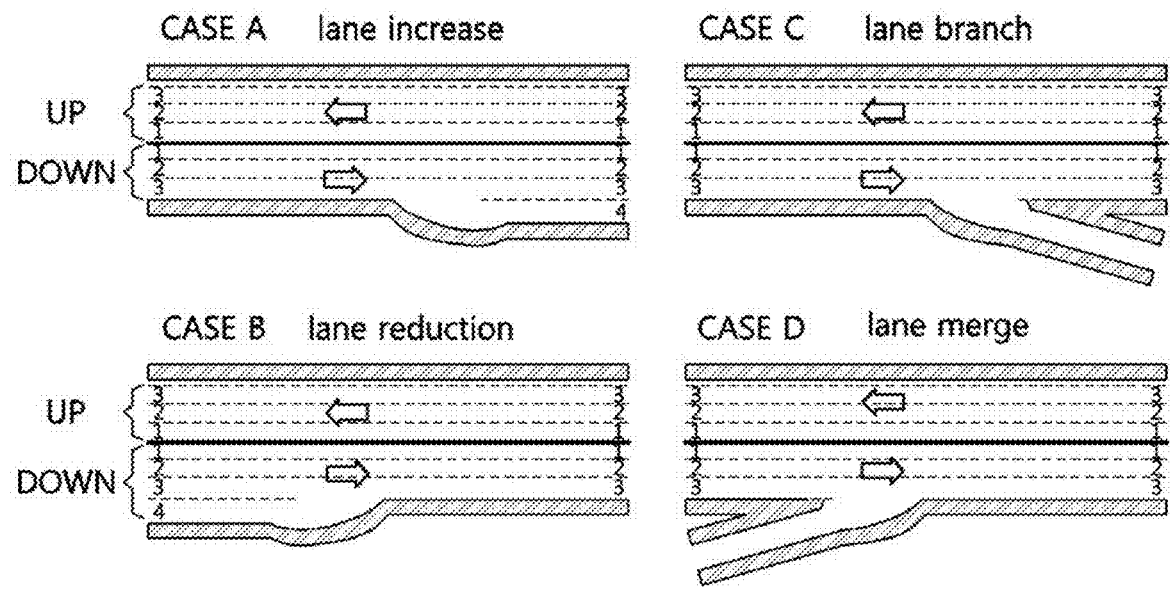
FIG. 21
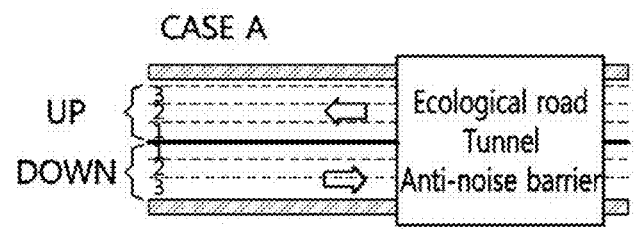
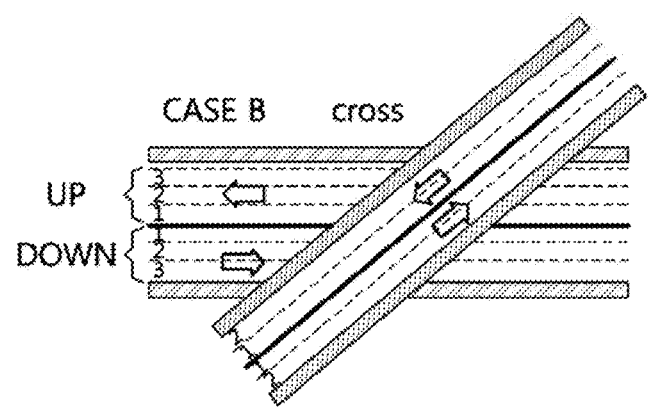

Case without street lights

Case with street light / one side

Case with street light / Two side (face-to-face)

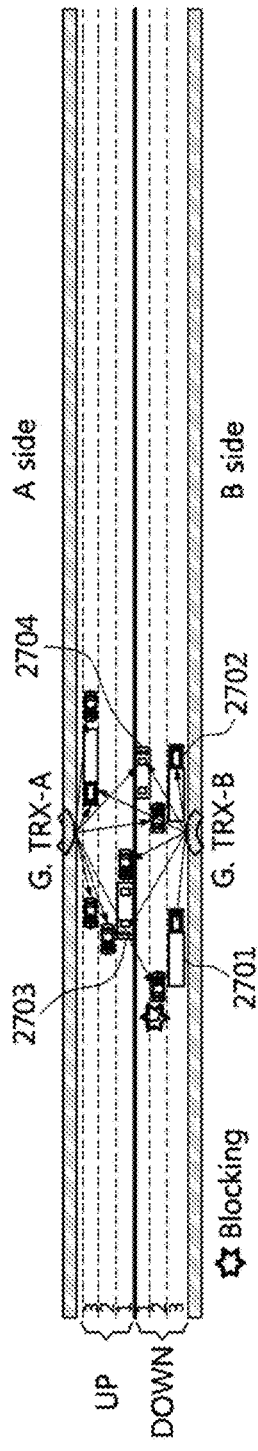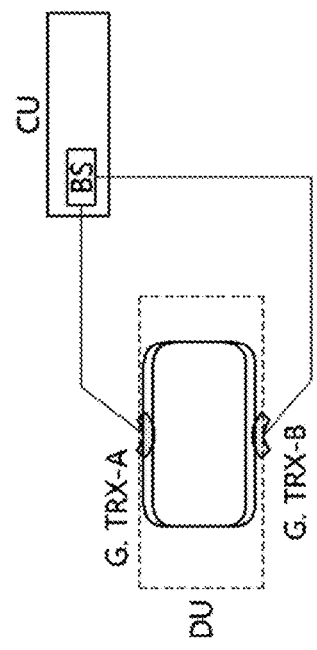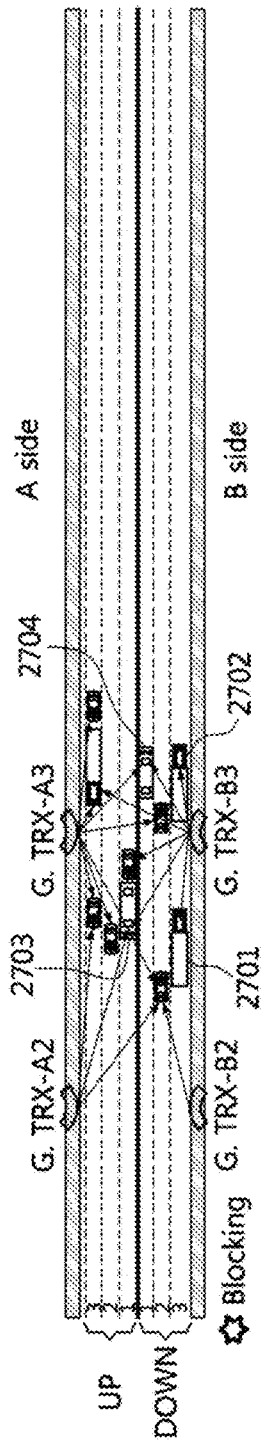

METHOD FOR OPERATING VERY HIGH FREQUENCY BASED ACCESS NETWORK, AND APPARATUS FOR THE SAME

CROSS-REFERENCE TO RELATED APPLICATIONS

This application claims priority to Korean Patent Applications No. 10-2018-0141975 filed on Nov. 16, 2018 and No. 10-2019-0125627 filed on Oct. 10, 2019 in the Korean Intellectual Property Office (KIPO), the entire contents of which are hereby incorporated by reference.

BACKGROUND

1. Technical Field

The present disclosure relates to a radio access network based on a very high frequency band, and more particularly, to a method for operating cells of a very high frequency band based radio access network, and an apparatus for the same.

2. Related Art

The exploitation of new frequency bands is important to meet the wireless data transmission capacity required in the future. In comparison with the propagation characteristics of the existing cellular frequency bands for radio access, the propagation characteristics (reflection, diffraction, refraction, and transmission, etc.) of using a very high frequency band for radio access appear differently.

As the frequency increases, a beamforming scheme may be used to reduce a free space loss proportional to a square of the frequency. In this case, due to the strong straightness, blocking may occur. However, there are some good features that do not spread spatial interference, and in order to ensure service coverage, more beams may be used at the same time, or the beams may be used as spatially and spatially separated through beam sweeping. In this reason, there is a need for changes in configuration and operation of the conventional radio access networks when using the very high frequency.

SUMMARY

Accordingly, exemplary embodiments of the present disclosure provide a method for operating cells of a very high frequency based radio access network.

Accordingly, exemplary embodiments of the present disclosure also provide an apparatus for operating cells of a very high frequency based radio access network.

According to exemplary embodiments of the present disclosure, a method for operating cells, performed by a central unit (CU) using at least one antenna assembly arranged around a moving path of moving objects, may comprise forming a cell for each of at least two layers by using the at least one antenna assembly; and moving the cell at a speed configured for a layer corresponding to the cell, wherein the cell is connected to a moving object having a speed corresponding to the speed configured for the layer corresponding to the cell.

Each of the at least one antenna assembly may operate as a distributed unit (DU).

Each of the at least one antenna assembly may comprise a set of at least one antenna module composed of M rows and N columns, M is a natural number equal to or greater than 1, and N is a natural number equal to or greater than 1.

The moving of the cell may be performed by selective ON/OFF control on the at least one antenna module.

The moving of the cell may be performed by phase and weigh control on the at least one antenna module.

The at least one antenna assembly may be connected to the CU via a point-to-multipoint (P2MP)/multipoint-to-point (MP2P) switch.

The P2MP/M2PM switch may simultaneously transmit one downlink signal to the at least one antenna assembly, combine signals received from the at least one antenna assembly and transfer the combined signals to the CU, or selectively transfer signals received from the at least one antenna assembly to the CU.

A first portion of the at least one antenna assembly may be installed on one side of the moving path, and a second portion of the at least one antenna assembly may be installed on the other side of the moving path.

At least a portion of beam coverages formed by a first portion of the at least one antenna assembly vertically may overlap with at least a portion of beam coverages formed by a second portion of the at least one antenna assembly.

At least a portion of beam coverages formed by a first portion of the at least one antenna assembly horizontally may overlap with at least a portion of beam coverages formed by a second portion of the at least one antenna assembly.

Each cell formed for each of the at least two layers may be assigned a different frequency allocation (FA).

Furthermore, according to exemplary embodiments of the present disclosure, an apparatus for operating cells by using at least one antenna assembly arranged around a moving path of moving objects may comprise at least one processor and a memory storing at least one instruction executable by the processor. Also, when executed by the at least one processor, the at least one instruction may be configured the at least one processor to: form a cell for each of at least two layers by using the at least one antenna assembly; and move the cell at a speed configured for a layer corresponding to the cell, wherein the cell is connected to a moving object having a speed corresponding to the speed configured for the layer corresponding to the cell.

Each of the at least one antenna assembly may operate as a distributed unit (DU).

Each of the at least one antenna assembly may comprise a set of at least one antenna module composed of M rows and N columns, M is a natural number equal to or greater than 1, and N is a natural number equal to or greater than 1.

The moving of the cell may be performed by selective ON/OFF control on the at least one antenna module or phase and weigh control on the at least one antenna module.

The at least one antenna assembly may be connected to the CU via a point-to-multipoint (P2MP)/multipoint-to-point (MP2P) switch.

The P2MP/M2PM switch may simultaneously transmit one downlink signal to the at least one antenna assembly, combine signals received from the at least one antenna assembly and transfer the combined signals to the CU, or selectively transfer signals received from the at least one antenna assembly to the CU.

A first portion of the at least one antenna assembly may be installed on one side of the moving path, and a second portion of the at least one antenna assembly may be installed on the other side of the moving path.

At least a portion of beam coverages formed by a first portion of the at least one antenna assembly vertically may overlap with at least a portion of beam coverages formed by a second portion of the at least one antenna assembly.

At least a portion of beam coverages formed by a first portion of the at least one antenna assembly horizontally may overlap with at least a portion of beam coverages formed by a second portion of the at least one antenna assembly.

Each cell formed for each of the at least two layers may be assigned a different frequency allocation (FA).

When using the cell operation methods and apparatuses according to the exemplary embodiments of the present disclosure, by hierarchically configuring the cells moving according to various speeds of moving objects, the frequent handover occurrences can be prevented in the very high frequency access network, so that performance degradation due to the frequent handover occurrences can be prevented. Further, in case of a lower layer (i.e., a layer of a cell moving at a low speed), the cell coverage can be reduced, thereby increasing the frequency reuse ratio and the capacity per unit area. Further, when a large number of vehicles are concentrated in a moving cell of one layer, it is made possible to continuously maintain a data rate per vehicle or improve the data rate per vehicle through carrier aggregation using available extra FAs.

BRIEF DESCRIPTION OF DRAWINGS

Embodiments of the present disclosure will become more apparent by describing in detail embodiments of the present disclosure with reference to the accompanying drawings, in which:

FIG. 4 is a conceptual diagram illustrating a third example of a beam sweeping operation using AMs belonging to an antenna assembly according to an exemplary embodiment of the present disclosure;

FIG. 17 is a conceptual diagram illustrating vertical overlapping and horizontal overlapping of the beam groups illustrated in FIG. 16;

FIGS. 20 to 22 are conceptual diagrams illustrating various road environments to which installation types of antenna assemblies according to an exemplary embodiment of the present disclosure are applied;

FIGS. 29A and 29B are conceptual diagrams illustrating a third example of DU-CU mapping for an antenna assembly according to an exemplary embodiment of the present disclosure;

FIGS. 30A to 30C are conceptual diagrams illustrating a fourth example of DU-CU mapping for an antenna assembly according to an exemplary embodiment of the present disclosure;

DETAILED DESCRIPTION

Figure 1:
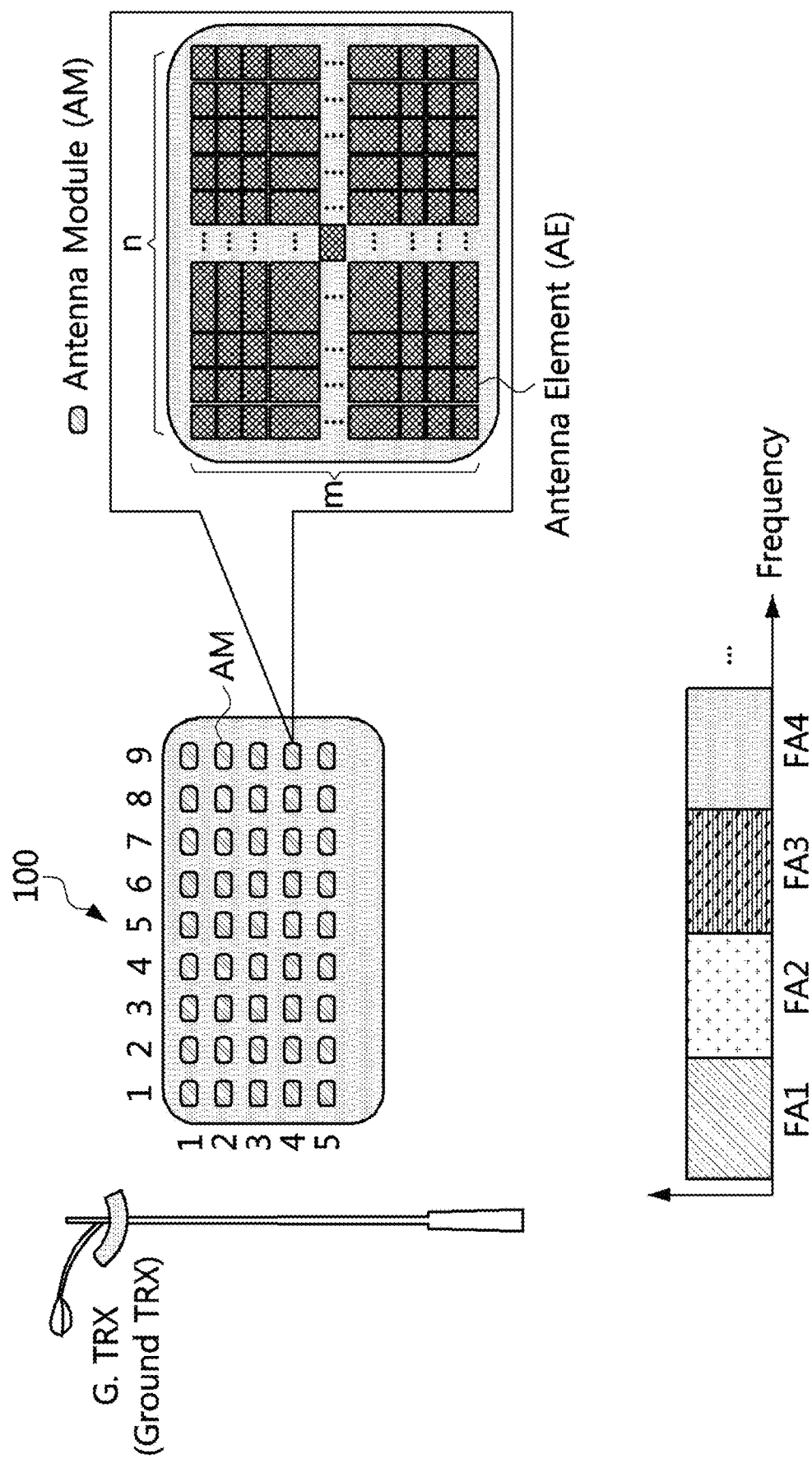
FIG. 1 is a conceptual diagram illustrating a configuration of an antenna assembly according to an exemplary embodiment of the present disclosure.

Embodiments of the present disclosure are disclosed herein. However, specific structural and functional details disclosed herein are merely representative for purposes of describing embodiments of the present disclosure, however, embodiments of the present disclosure may be embodied in many alternate forms and should not be construed as limited to embodiments of the present disclosure set forth herein.

Accordingly, while the present disclosure is susceptible to various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described in greater detail with reference to the accompanying drawings. In order to facilitate general understanding in describing the present disclosure, the same components in the drawings are denoted with the same reference signs, and repeated description thereof will be omitted.

In the following description, 'very high frequency' may mean super high frequency (SHF) in a 3 to 30 GHz frequency range, extremely high frequency (EHF) in a 30 to 300 GHz frequency range, or tremendously high frequency (THF) in a 300 to 3000 GHz frequency range.

In the following description, a moving object means a vehicle, and a moving path may mean a road along which the vehicle moves. However, various exemplary embodiments of the present disclosure may be applied to various moving objects such as high speed trains or aircrafts (e.g., airplanes or drones). In this case, a moving path may mean a railroad or an airway along which the aircraft moves.

Antenna Assembly and Beam Sweeping Using the Same

FIG. 1 is a conceptual diagram illustrating a configuration of an antenna assembly according to an exemplary embodiment of the present disclosure.

As shown in FIG. 1, an antenna assembly 100 according to an exemplary embodiment of the present disclosure may include a total of 45 (=5 rows×9 columns) antenna modules (hereinafter, referred to as 'antenna modules (AMs)'). That is, the antenna assembly 100 may be configured with an array of AMs of M×N, wherein M and N each is a natural number equal to or greater than 1.

Although FIG. 1 illustrates an exemplary embodiment in which the antenna assembly is composed of 45 AMs, the number, rows, and columns of AMs constituting the antenna assembly may be variously changed according to service coverage and performance of the AMs.

Each AM constituting the antenna assembly 100 may be composed of m×n antenna elements (hereinafter, referred to as 'antenna elements (AEs)'). Since the AM uses very high frequency, it may be made small, and a beam may be emitted by the AM over a long distance by using a plurality of AEs to form the beam.

In this case, a beam formed by one AM may exist in each of a plurality of subbands (e.g., frequency allocation 1 (FA1), FA2, FA3, FA4, FA5, and the like), and the beam of each subband may be operated independently.

In the antenna assembly 100, one AM may be turned ON and OFF for the respective beams allocated to the FAs. For example, all the 45 AMs may be turned ON for FA1, or they may behave as if the beam is sweeping by spatially turning them ON and OFF.

Meanwhile, the antenna assembly may function as a distributed unit (DU) and may be installed at a ground transmission and reception point (G.TRX) located around a moving path of moving objects. Since the antenna assembly is installed in a G.TRX, the antenna assembly may also be referred to hereinafter as the G.TRX itself.

In a road environment, the G.TRX may be installed in existing infrastructure, such as street-light with electricity. However, in the absence of existing infrastructure such as the street-light, a separate pole or support may be installed, and the G.TRX may be installed using the pole or support.

Figure 2:
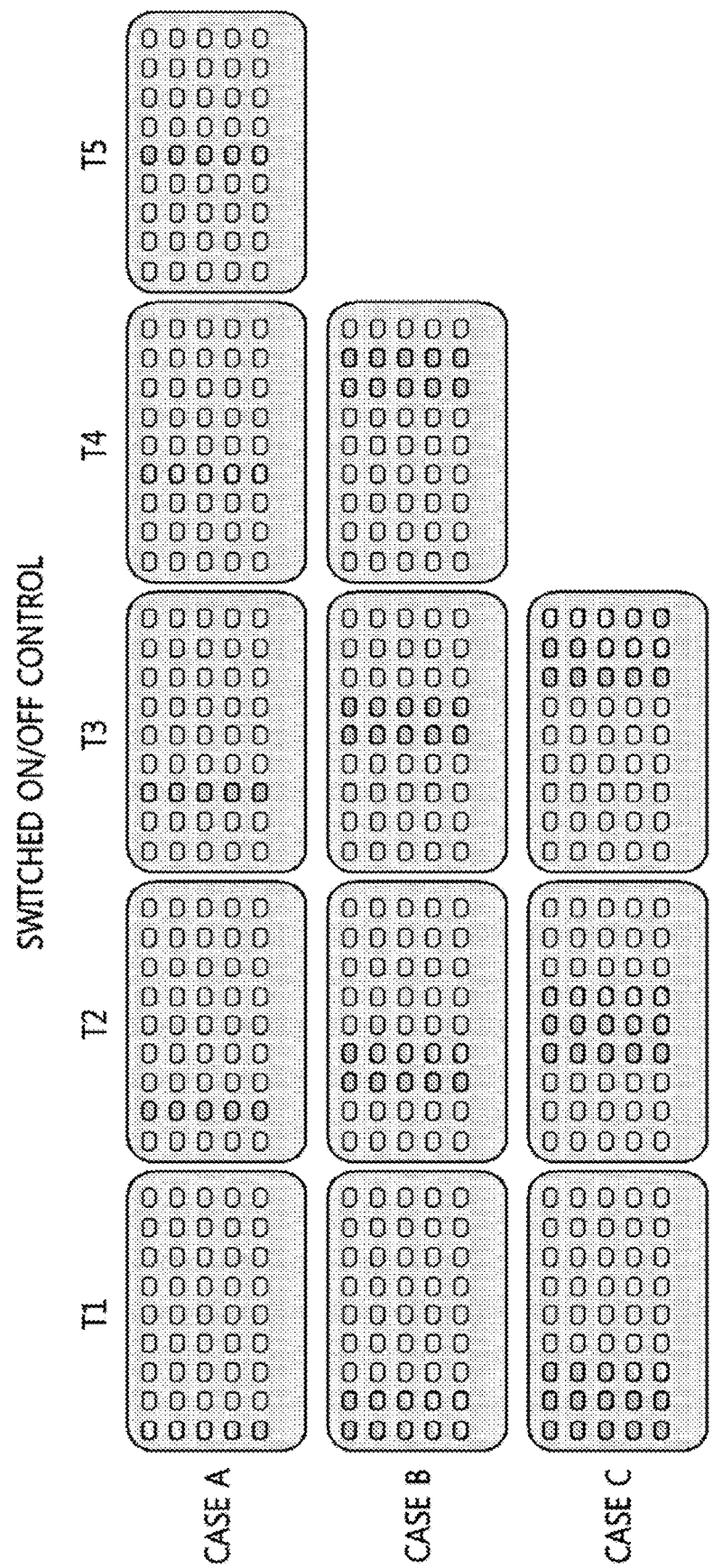
FIG. 2 is a conceptual diagram illustrating a first example of a beam sweeping operation using AMs belonging to an antenna assembly according to an exemplary embodiment of the present disclosure.

FIG. 2 is a conceptual diagram illustrating a first example of a beam sweeping operation using AMs belonging to an antenna assembly according to an exemplary embodiment of the present disclosure.

Referring to FIG. 2, three cases (i.e., CASE A, CASE B, and CASE C) of beam sweeping through ON/OFF control on the AMs of the G.TRX are described.

First, in CASE A, AMs corresponding to one column located in the G.TRX may be sequentially turned ON and OFF as time elapses (e.g., T1, T2, T3, T4, and T5). For example, at the time point T1, the AMs 1-1, 2-1, 3-1, 4-1, and 5-1 located in the first column may be turned ON. Also, at the time point T2, the AMs 1-1, 2-1, 3-1, 4-1, and 5-1 located in the first column are turned OFF, and the AMs 1-2, 2-2, 3-2, 4-2, and 5-2 located in the second column may be turned ON. Also, at the time point T3, the AMs 1-2, 2-2, 3-2, 4-2, and 5-2 located in the second column are turned OFF, and the AMs 1-3, 2-3, 3-3, 4-3, and 5-3 located in the third column may be turned ON. That is, in CASE A, 5 AMs corresponding to one column may be slid to the right without overlapping through ON/OFF control on the AMs.

Next, in CASE A, AMs corresponding to two columns located in the G.TRX may be sequentially turned ON and OFF as time elapses (e.g., T1, T2, T3, T4, and T5). For example, at time point T1, the AMs 1-1, 2-1, 3-1, 4-1, and 5-1 located in the first column and the AMs 1-2, 2-2, 3-2, 4-2, and 5-2 located in the second column may be turned ON. Also, at the time point T2, the AMs located in the two columns turned ON at the time point T1 may be turned OFF, and the AMs 1-3, 2-3, 3-3, 4-3 and 5-3 located in the third column and the AMs 1-4, 2-4, 3-4, 4-4, and 5-4 located in the fourth column may be turned ON. Also, at the time point T3, the AMs located in the two columns turned ON at the time point T2 may be turned OFF, and the AMs 1-5, 2-5, 3-5, 4-5 and 5-5 located in the fifth column and the AMs 1-6, 2-6, 3-6, 4-6, and 5-6 located in the sixth column may be turned ON. That is, in CASE B, 10 AMs corresponding to two columns may be slid to the right without overlapping through ON/OFF control on the AMs.

Next, in CASE C, AMs corresponding to three columns located in the G.TRX may be sequentially turned ON and OFF as time elapses (e.g., T1, T2, T3, T4, and T5). For example, at the time point T1, the AMs 1-1, 2-1, 3-1, 4-1, and 5-1 located in the first column, the AMs 1-2, 2-2, 3-2, 4-2, and 5-2 located in the second column, and the AMs 1-3, 2-3, 3-3, 4-3, and 5-3 located in the third column may be turned ON. Also, at the time point T2, the AMs located in the three columns turned ON at the time point T1 may be turned OFF, and the AMs 1-4, 2-4, 3-4, 4-4, and 5-4 located in the fourth column, the AMs 1-5, 2-5, 3-5, 4-5, and 5-5 located in the fifth column, and the AMs 1-6, 2-6, 3-6, 4-6, and 5-6 located in the sixth column may be turned ON. Also, at the time point T3, the AMs located in the three columns turned ON at the time point T2 may be turned OFF, and the AMs 1-7, 2-7, 3-7, 4-7, and 5-7 located in the seventh column, the AMs 1-8, 2-8, 3-8, 4-8, and 5-8 located in the eighth column, and the AMs 1-9, 2-9, 3-9, 4-9, and 5-9 located in the ninth column may be turned ON. That is, in CASE C, 15 AMs corresponding to three columns may be slid to the right without overlapping through ON/OFF control on the AMs.

CASE A, CASE B, and CASE C illustrated in FIG. 2 are such that AMs previously turned ON and AMs currently turned ON do not overlap. In such the movement, different types of switched movements (beam sweeping) may be applied for some FAs rather than all available FAs. For example, the AMs may move to the left as well as to the right as described in FIG. 2. Alternatively, the AMs located in the G.TRX may be divided and moved in opposite directions. For example, the AMs located in the first, second, and third rows of the G.TRX may be moved through ON/OFF control in the left direction, and the AMs located in the fourth and fifth rows may be moved through ON/OFF control in the right direction. Alternatively, the AMs located in the G.TRX may be moved in different directions for the respective FAs. For example, the AMs may be moved to the right by the whole rows for FA1, and the AMs may be moved to the left by the whole rows for FA2.

Figure 3:
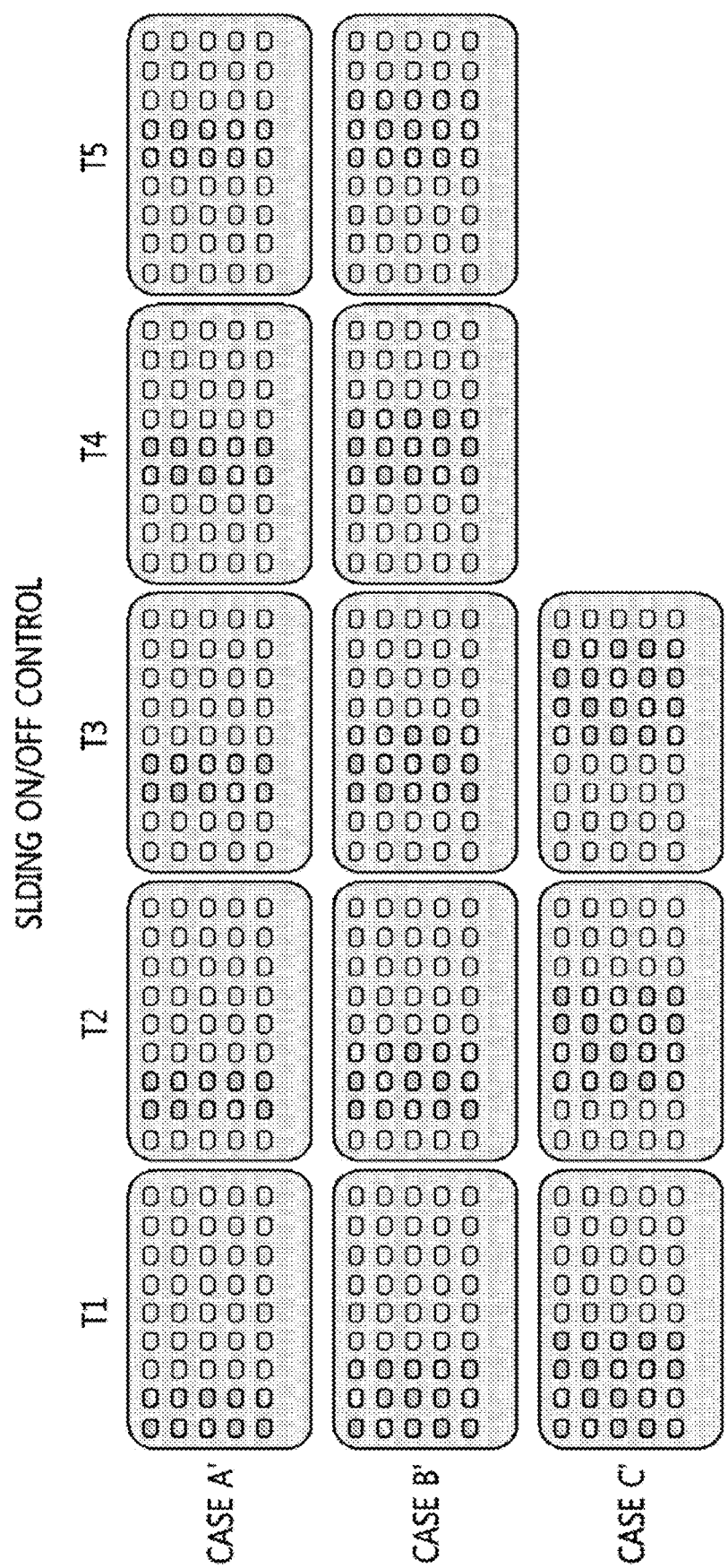
FIG. 3 is a conceptual diagram illustrating a second example of a beam sweeping operation using AMs belonging to an antenna assembly according to an exemplary embodiment of the present disclosure.

FIG. 3 is a conceptual diagram illustrating a second example of a beam sweeping operation using AMs belonging to an antenna assembly according to an exemplary embodiment of the present disclosure.

Referring to FIG. 2, three cases (i.e., CASE A', CASE B', and CASE C') of beam sweeping through ON/OFF control on the AMs of the G.TRX are described. Unlike the cases illustrated in FIG. 2 (i.e., CASE A, CASE B, and CASE C), CASE A', CASE B', and CASE C' of FIG. 3 are schemes in which some of the AMs previously turned ON and some of the AMs currently turned ON are overlapped.

First, CASE A' is a scheme of turning ON AMs corresponding to two columns (10 AMs total) and sliding them to the right while overlapping one column. CASE B' is a scheme of turning ON AMs corresponding to three columns (15 AMs total) and sliding them to the right while overlapping two columns. CASE C' is a scheme of turning ON AMs corresponding to four columns (20 AMs total) and sliding them to the right while overlapping two columns.

In this movement, several types of different switched movement schemes (beam sweeping) may be applied for some FAs rather than all available FAs. For example, the AMs may be slid to the left as well as to the right as described in FIG. 3. Alternatively, the AMs located in the G.TRX may be divided and moved in opposite directions. For example, the AMs located in the first, second, and third rows of the G.TRX may be slid through ON/OFF control in the left direction, and the AMs located in the fourth and fifth rows may be slid through ON/OFF control in the right direction. Alternatively, the AMs located in the G.TRX may be moved in different directions for the respective FAs. For example, for FA1, the AMs may be slid to the right by all rows and for FA2, the AMs may be slid to the left by all rows.

In the G.TRX illustrated in FIG. 1, 45 AMs (=5 rows×9 columns) are installed, and all the AMs are turned ON to operate. Alternatively, as illustrated in FIGS. 2 and 3, effects similar to beam sweeping (switched movement scheme or sliding movement scheme) may be obtained through the ON/OFF control on the specific AMs.

On the other hand, only the AMs corresponding to one column (or row) are installed in the center, and the same effect as the ON/OFF control on the AMs illustrated in FIGS. 2 and 3 may be obtained through phase and weight control thereof.

FIG. 4 is a conceptual diagram illustrating a third example of a beam sweeping operation using AMs belonging to an antenna assembly according to an exemplary embodiment of the present disclosure.

Referring to FIG. 4, the same effect as that of the ON/OFF control on the AMs described in FIGS. 2 and 3 may be obtained through phase and weight control on one column of AMs (5 AMs) installed in the center of the G.TRX. This control scheme may be referred to as '1 line (1D) weight and phase control'. On the other hand, the discrete movement schemes of AMs as illustrated in FIGS. 2 and 3 may be obtained through the phase and weight control (illustrated in the bottom left of FIG. 4). Alternatively, a continuous AM movement scheme may be obtained without spatial division through such the phase and weight control (illustrated in the lower right of FIG. 4).

Meanwhile, the concept of cell movements based on the sliding of AMs through ON/OFF control or phase/weight control on the AMs will be described later with reference to FIGS. 37 to 41.

Configuration of Beam Coverage and Beam Group

Figure 5:
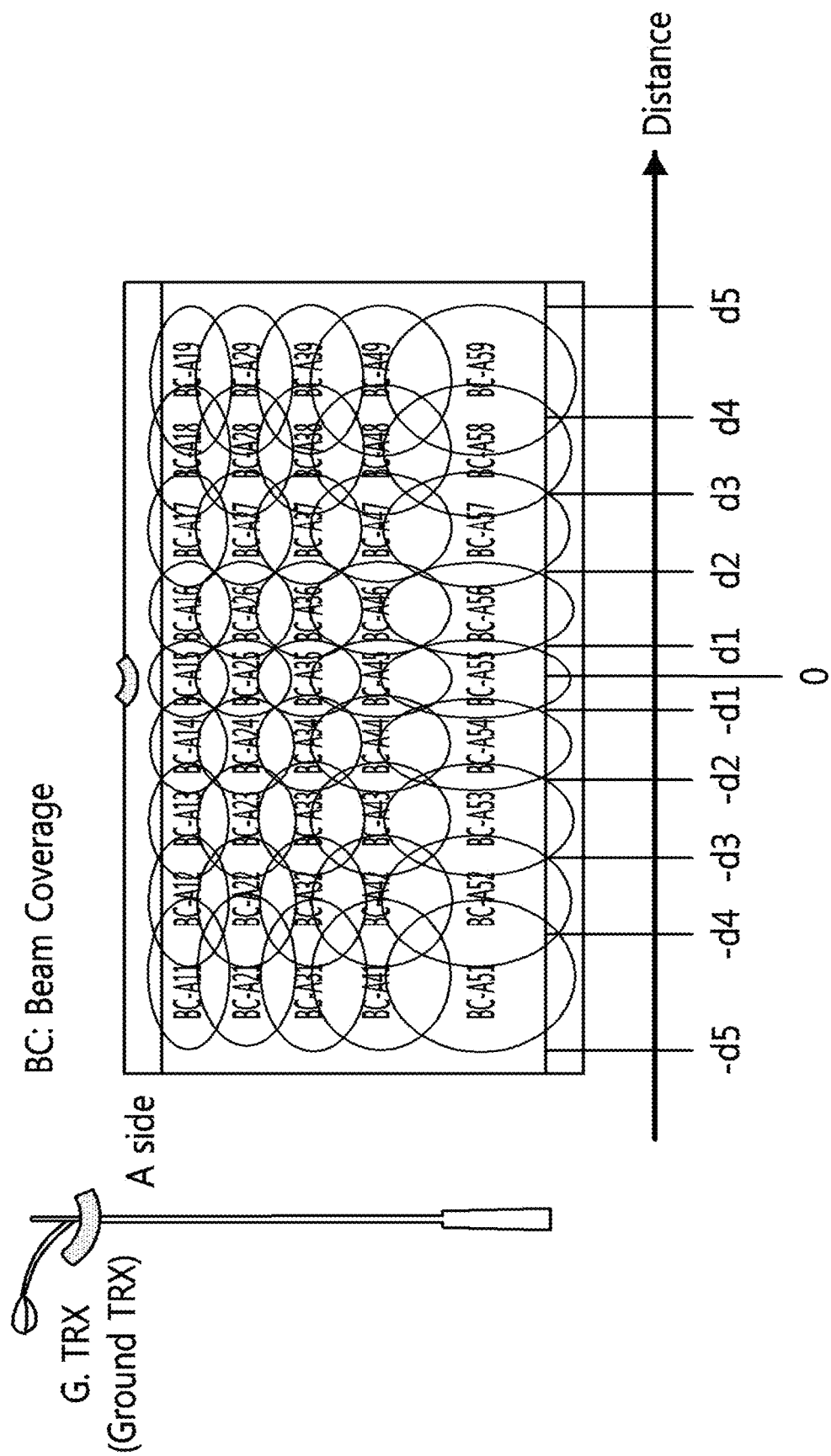
FIG. 5 is a conceptual diagram illustrating a first example of beam coverages formed by AMs belonging to an antenna assembly according to an exemplary embodiment of the present disclosure.

FIG. 5 is a conceptual diagram illustrating a first example of beam coverages formed by AMs belonging to an antenna assembly according to an exemplary embodiment of the present disclosure.

Referring to FIG. 5, a G.TRX may be installed on a pole such as a street-light on one side (e.g., A side) of a road. Assuming that G.TRX includes 45 AMs composed of 5 rows by 9 columns as illustrated in FIG. 1, each of the 45 AMs may separately form service coverage on the road. In this case, the service coverage formed by each of the AMs may be referred to as a 'beam coverage (BC)'. Even in an AM operating under the same conditions, each beam coverage region may be formed differently.

Assuming the antenna assembly of FIG. 1, a beam coverage of the AM corresponding to the fourth row and the sixth column may be denoted as 'BC-46'. More specifically, since it is the coverage projected from the A side, it may be referred to as 'BC-A46 coverage'.

Figure 6:
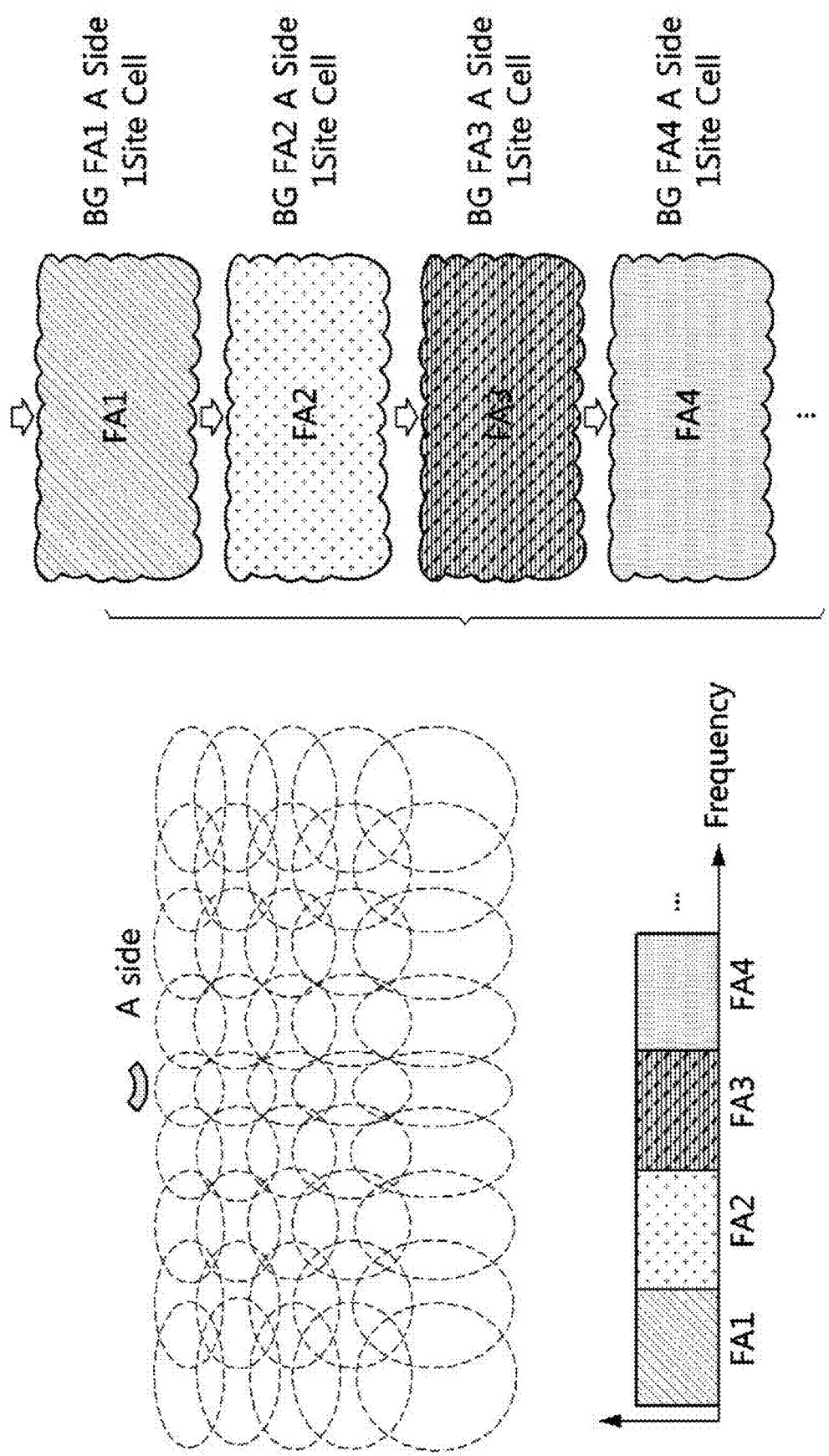
FIG. 6 is a conceptual diagram illustrating a first example of a beam group formed by AMs belonging to an antenna assembly according to an exemplary embodiment of the present disclosure.

FIG. 6 is a conceptual diagram illustrating a first example of a beam group formed by AMs belonging to an antenna assembly according to an exemplary embodiment of the present disclosure.

The beam coverage formed by each of the 45 AMs mounted on the G.TRX described in FIG. 1 may be independently operated for each of several subbands (e.g., FA1, FA2, FA3, FA4, . . . ) belonging to all available FAs. Therefore, it may be assumed that each AM has beam coverage for each FA. Such the FA-specific BCs may be operated independently as illustrated in FIGS. 2 and 3.

Referring to FIG. 6, when the 45 AMs of the G.TRX transmit the same content to the beam coverages formed for each FA through downlink, or receive the same content from the beam coverages formed for each FA through uplink (i.e., content synchronization), these AM may operate as one cell.

For example, if the beams corresponding to FA1 are grouped and operated as one cell, this one cell may be referred to as a 'BG FA1 A Side 1Site Cell'. Here, 'BG' means a beam group, 'A Side' means a beam group formed by the AMs installed on the A side of the road, and '1Site' means that the beam group is formed by one G.TRX site. Similarly, many cells such as 'BG FA2 A Side 1Site Cell', 'BG FA3 A Side 1Site Cell', and 'BG FA4 A Side 1Site Cell' may exist in the same space at the same time. The beams grouped for each FA may be different.

Figure 7:
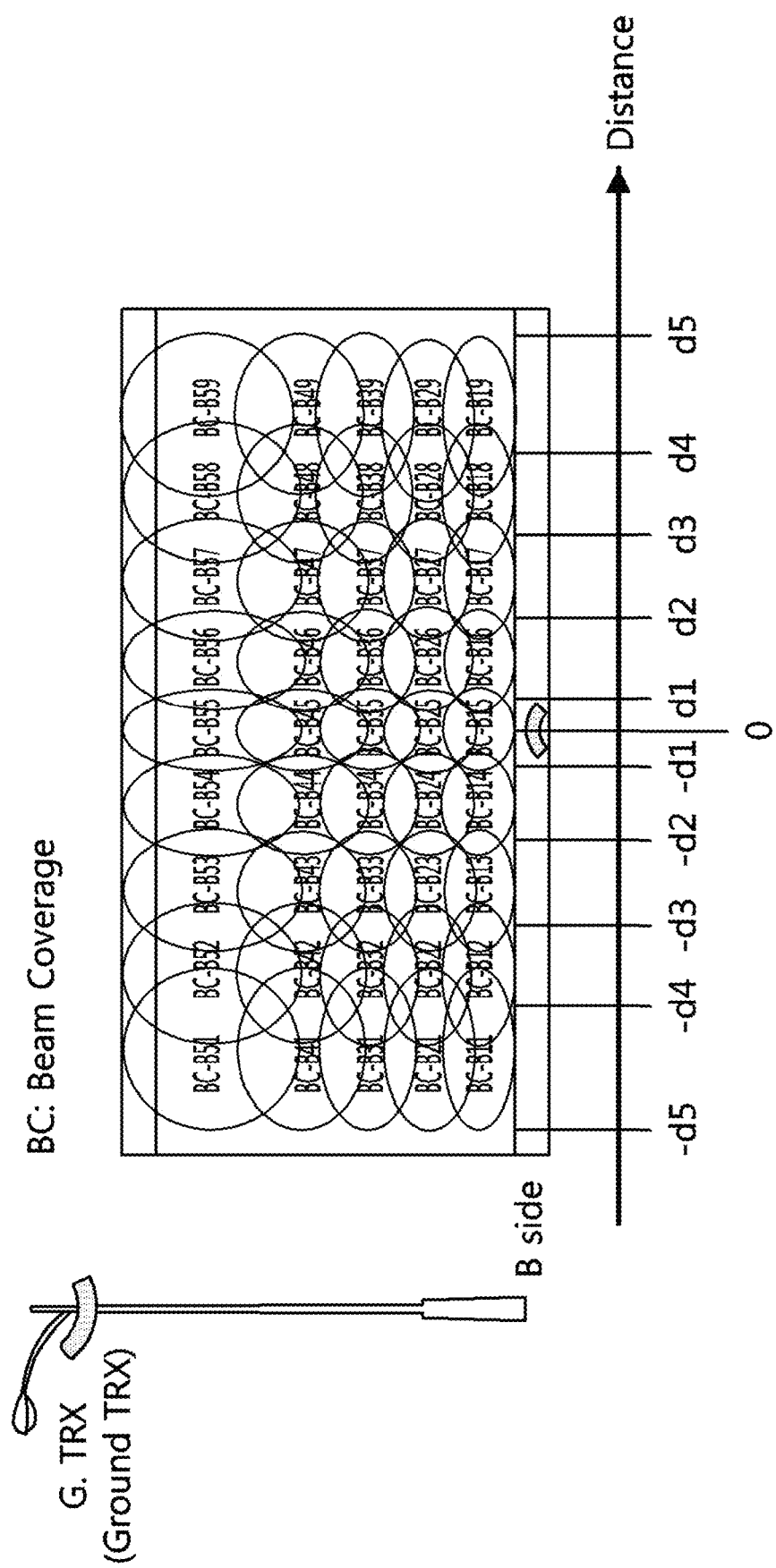
FIG. 7 is a conceptual diagram illustrating a second example of beam coverages formed by AMs belonging to an antenna assembly according to an exemplary embodiment of the present disclosure.

FIG. 7 is a conceptual diagram illustrating a second example of beam coverages formed by AMs belonging to an antenna assembly according to an exemplary embodiment of the present disclosure.

Referring to FIG. 7, a G.TRX may be installed on a pole such as a street-light on the other side (e.g., B side) of the road. Assuming that G.TRX includes 45 AMs composed of 5 rows by 9 columns as illustrated in FIG. 1, each of the 45 AMs may separately form service coverage on the road. Similarly to the case illustrated in FIG. 5, the service coverage formed by each of the AMs may be referred to as a 'beam coverage (BC)'. Even in an AM operating under the same conditions, each beam coverage region may be formed differently.

Assuming the antenna assembly of FIG. 1, a beam coverage of the AM corresponding to the fourth row and the sixth column may be denoted as 'BC-46'. More specifically, since it is the coverage projected from the B side, it may be referred to as 'BC-B46 coverage'.

Figure 8:
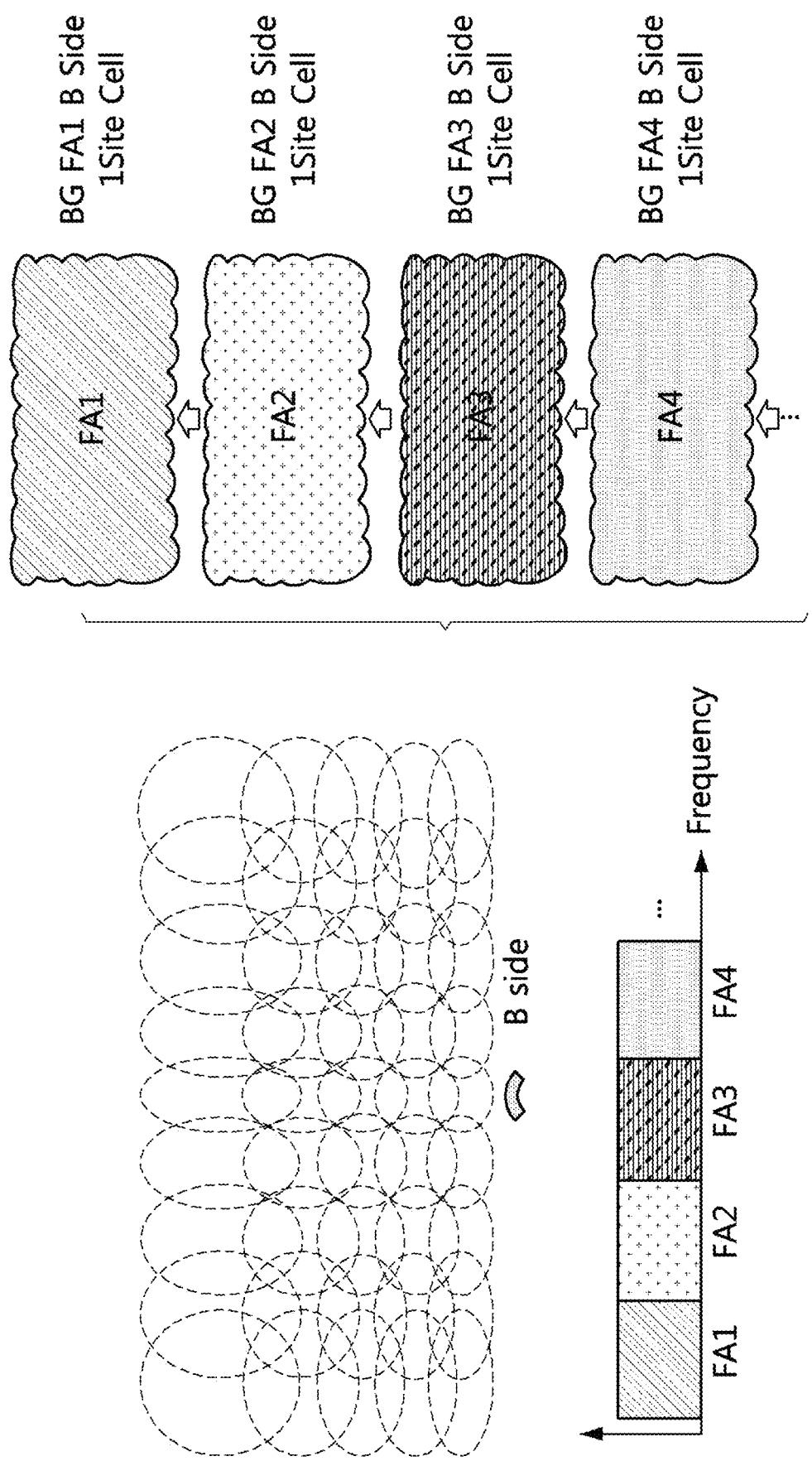
FIG. 8 is a conceptual diagram illustrating a second example of a beam group formed by AMs belonging to an antenna assembly according to an exemplary embodiment of the present disclosure.

FIG. 8 is a conceptual diagram illustrating a second example of a beam group formed by AMs belonging to an antenna assembly according to an exemplary embodiment of the present disclosure.

The beam coverage formed by each of the 45 AMs mounted on the G.TRX described in FIG. 1 may be independently operated for each of several subbands (e.g., FA1, FA2, FA3, FA4, . . . ) belonging to all available FAs. Therefore, it may be assumed that each AM has beam coverage for each FA. Such the FA-specific BCs may be operated independently as illustrated in FIGS. 2 and 3.

Referring to FIG. 8, when the 45 AMs of the G.TRX transmit the same content to the beam coverages formed for each FA through downlink, or receive the same content from the beam coverages formed for each FA through uplink (i.e., content synchronization), these AM may operate as one cell.

For example, if the beams corresponding to FA1 are grouped and operated as one cell, this one cell may be referred to as a 'BG FA1 B Side 1Site Cell'. Here, 'BG' means a beam group, 'B Side' means a beam group formed by the AMs installed on the B side of the road, and '1Site' means that the beam group is formed by one G.TRX site. Similarly, many cells such as 'BG FA2 B Side 1Site Cell', 'BG FA3 B Side 1Site Cell', and 'BG FA4 B Side 1Site Cell' may exist in the same space at the same time. The beams grouped for each FA may be different.

Figure 9:
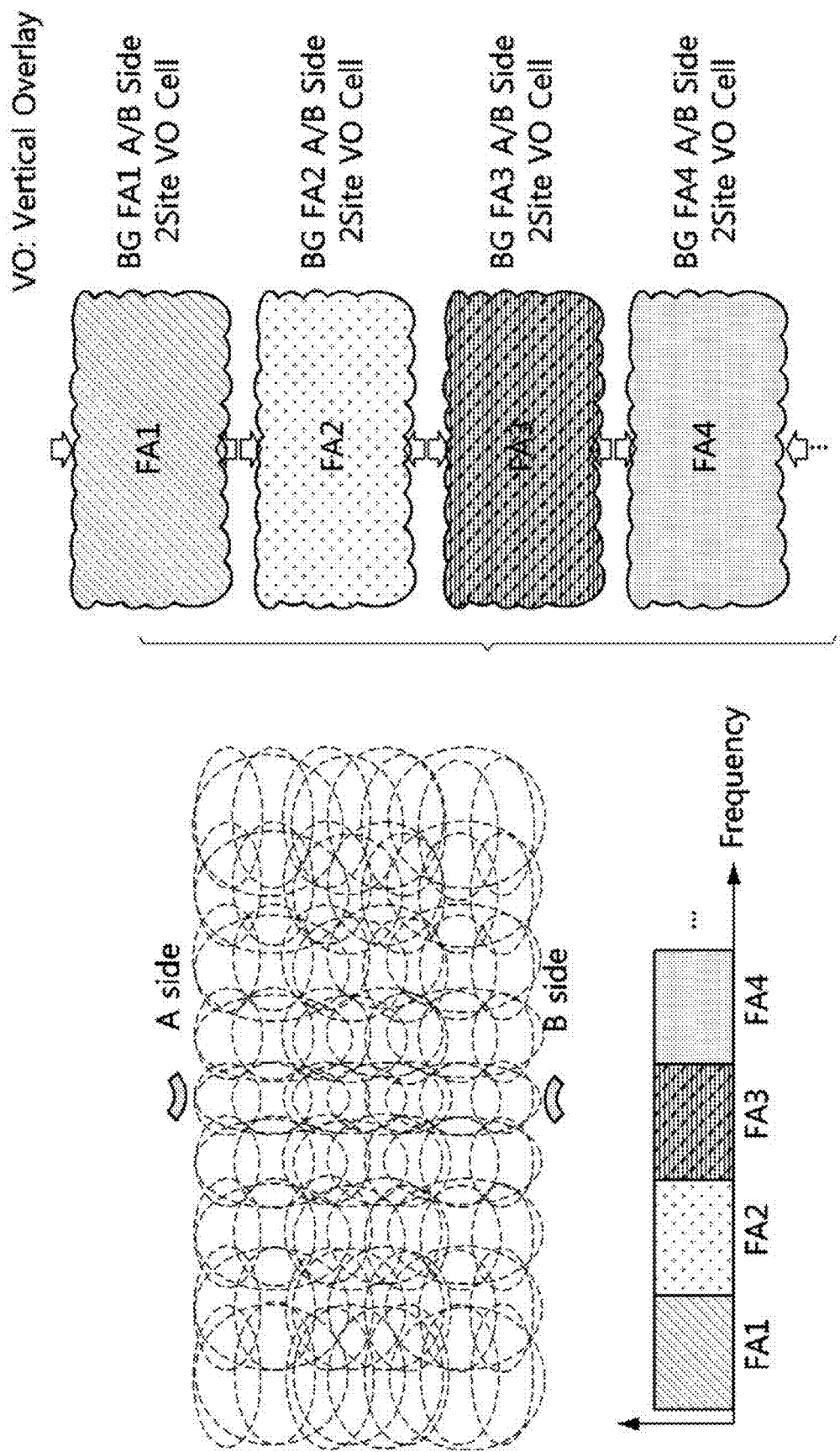
FIG. 9 is a conceptual diagram illustrating a beam group when the G.TRX of FIG. 6 and the G.TRX of FIG. 8 are applied to both sides of a road.

FIG. 9 is a conceptual diagram illustrating a beam group when the G.TRX of FIG. 6 and the G.TRX of FIG. 8 are applied to both sides of a road.

Referring to FIG. 9, a case where the G.TRXs described in FIG. 1 are arranged as facing each other on both sides of the road is illustrated. That is, beam coverages formed by a total of 45 individual AMs mounted on the G.TRX (i.e., A Side G.TRX) installed on the A side of the road and beam coverages formed by a total of 45 individual AMs mounted on the G.TRX (i.e., B Side G.TRX) installed on the B side of the road may be used together.

That is, in FIG. 9, a scheme of grouping and simultaneously using both the beam coverages described in FIGS. 6 and 8 is illustrated. The content synchronization may be applied to transmissions of two sites. Similarly, if the beam coverages can be independently operated for each of several subbands (e.g., FA1, FA2, FA3, FA4, . . . ) belonging to all available FAs, it may be assumed that each AM has a beam coverage for each FA. In addition, these FA-specific BCs may be operated independently as in the case of FIGS. 2 and 3.

Referring to FIG. 9, when a total of 90 beams of the 45 AMs of the A Side G.TRX and the 45 AMs of the B Side G.TRX transmit the same content to the beam coverages formed for each FA through downlink, or receive the same content from the beam coverages formed for each FA through uplink (i.e., content synchronization), these 90 AMs may operate as one cell. For example, if the beams corresponding to FA1 are grouped and operated as one cell, this one cell may be referred to as a 'BG FA1 A/B Side VO Cell'. Here, 'BG' means a beam group, 'A/B Side' means a beam group formed by the AMs installed on both of the A side and the B side of the road, and '2Site' means that the beam group is formed by two G.TRX sites. Similarly, many cells such as 'BG FA2 A/B Side 2Site Cell', 'BG FA3 A/B Side 2Site Cell', and 'BG FA4 A/B Side 2Site Cell' may exist in the same space at the same time. The beams grouped for each FA may be different.

Figure 10:
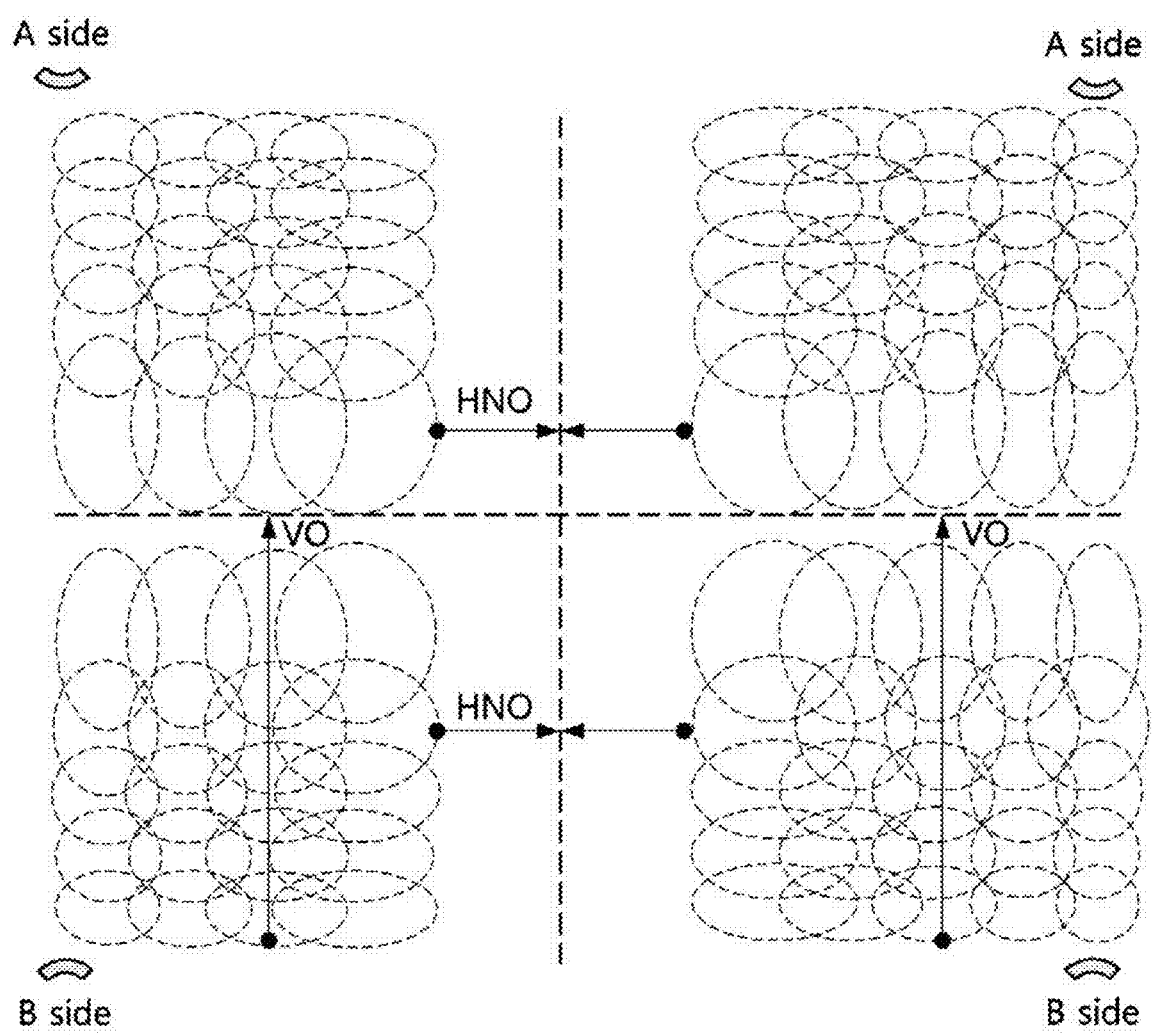
FIG. 10 is a conceptual diagram illustrating a first example of beam groups formed by AMs of four antenna assemblies according to an exemplary embodiment of the present disclosure.

FIG. 10 is a conceptual diagram illustrating a first example of beam groups formed by AMs of four antenna assemblies according to an exemplary embodiment of the present disclosure.

Referring to FIG. 10, two G.TRXs exist on each of the A side and the B side of the road, and they may form one cell.

Specifically, two beam groups formed by two G.TRXs located on the A side of the road and two beam groups formed by two G.TRXs located on the B side of the road may be simultaneously used to form one cell. The beam coverages (i.e., a total of 90 beam coverages), formed by 20 AMs (=5×4) which are a portion of AMs of the A Side G.TRX installed on one side (e.g., left side) of the A side of the road, 25 AMs (=5×5) which are a portion of AMs of the A Side G.TRX installed on the other side (e.g., right side) of the A side of the road, 20 AMs (=5×4) which are a portion of AMs of the B Side G.TRX installed on one side (e.g., left side) of the B side of the road, and 25 AMs (=5×5) which are a portion of AMs of the B Side G.TRX installed on the other side (e.g., right side) of the B side of the road, may be used to form one cell.

The beam groups formed by four G.TRX sites form one cell through vertical overlapping (VO) and horizontal non-overlapping (HNO).

Figure 11:
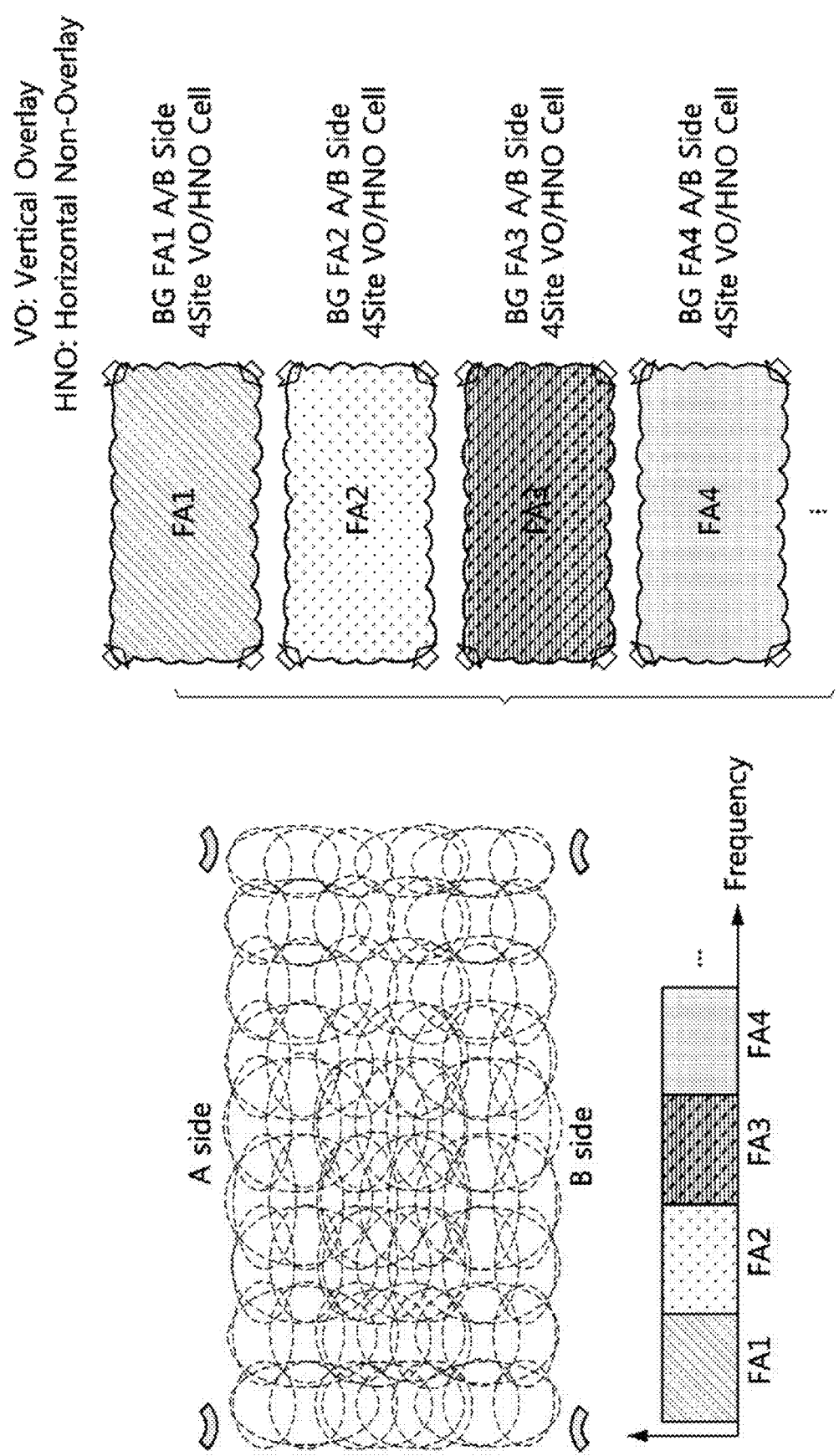
FIG. 11 is a conceptual diagram illustrating vertical overlapping and horizontal non-overlapping of the beam groups illustrated in FIG. 10.

FIG. 11 is a conceptual diagram illustrating vertical overlapping and horizontal non-overlapping of the beam groups illustrated in FIG. 10.

Referring to FIG. 11, a concept of forming a cell in a manner of vertically overlapping and horizontally not overlapping the beam coverage groups formed using the AMs of the two G.TRXs installed on the A side of the road and the AMs of the two G.TRXs installed on the B side of the road is illustrated.

That is, the beam coverage groups of the left G.TRX on the A side of the road and the left G.TRX on the B side of the road overlap vertically, and the beam coverage groups of the right G.TRX on the A side of the road and the right G.TRX on the B side of the road overlap vertically. On the other hand, the beam coverage groups formed by the left G.TRX and the right G.TRX on the A side of the road do not overlap horizontally, and the beam coverage groups formed by the left G.TRX and the right G.TRX on the B side of the road do not overlap horizontally. For all the beam coverages grouped into one cell, the content synchronization may be performed on the downlink, and uplink transmission may be received at multiple sites (two to four sites) among four sites.

Referring to FIG. 11, for example, if the beams corresponding to FA1 are grouped and operated as one cell, this one cell may be referred to as a 'BG FA1 A/B Side 4Site VO/HNO Cell'. Here, 'BG' means a beam group, 'A/B Side' means a beam group formed by the AMs installed on both of the A side and the B side of the road, and '4Site' means that the beam group is formed by four G.TRX sites. In addition, 'VO (vertical overlap)' means that the beam group of the A Side G.TRX and the beam group of the B Side G.TRX overlap vertically, and 'HNO (horizontally non-overlap)' means that the beam groups of the left and right G.TRXs do not overlap horizontally. Similarly, many cells such as 'BG FA2 A/B Side 4Site VO/HNO Cell', 'BG FA3 A/B Side 4Site VO/HNO Cell', and 'BG FA4 A/B Side 4Site VO/HNO Cell' may exist in the same space at the same time. The beams grouped for each FA may be different.

Figure 12:
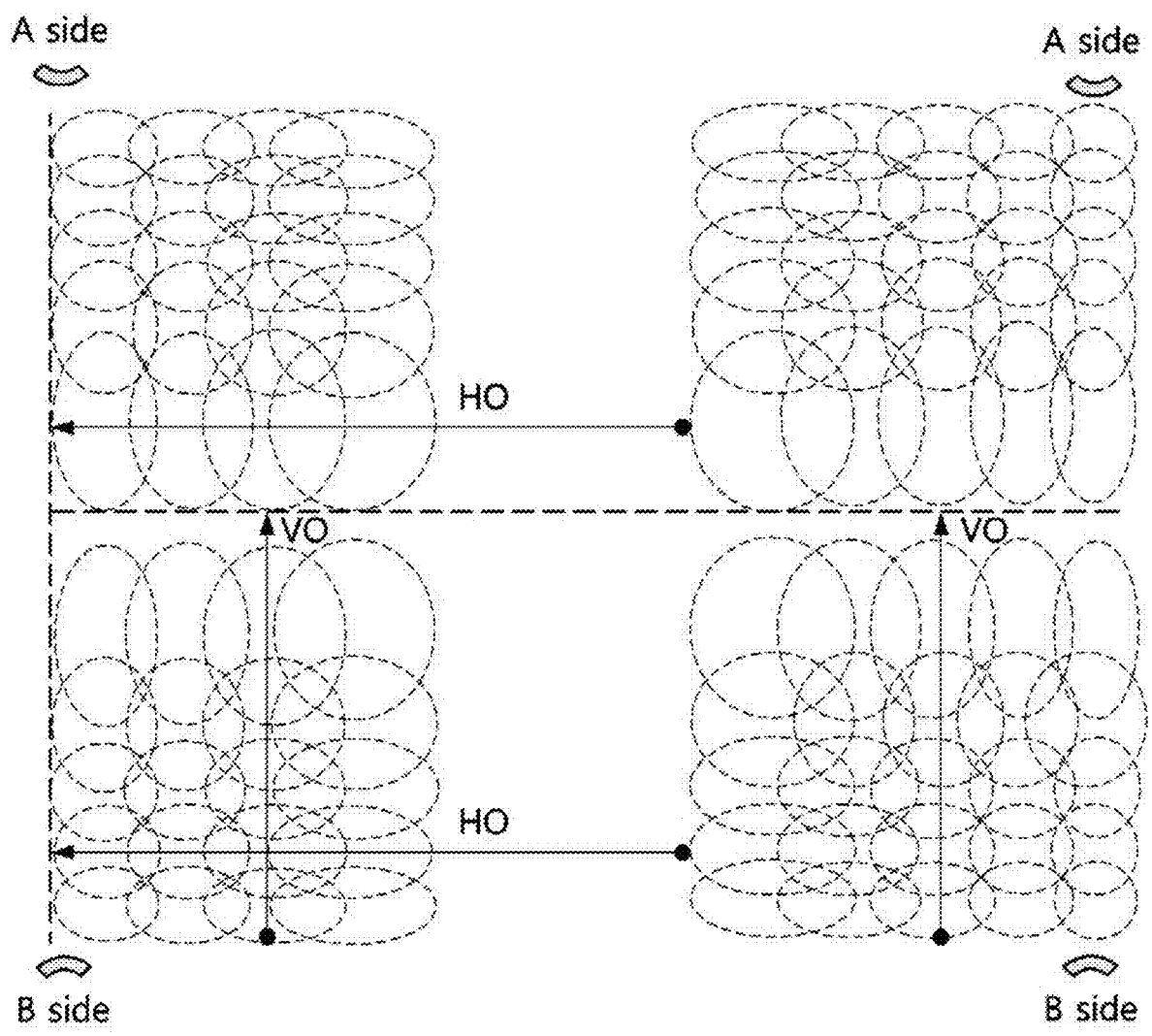
FIG. 12 is a conceptual diagram illustrating a second example of beam groups formed by AMs of four antenna assemblies according to an exemplary embodiment of the present disclosure.

FIG. 12 is a conceptual diagram illustrating a second example of beam groups formed by AMs of four antenna assemblies according to an exemplary embodiment of the present disclosure.

Referring to FIG. 12, two G.TRXs exist on each of the A side and the B side of the road, and they may form one cell.

Specifically, two beam groups formed by two G.TRXs located on the A side of the road and two beam groups formed by two G.TRXs located on the B side of the road may be simultaneously used to form one cell. The beam coverages (i.e., a total of 90 beam coverages), formed by 20 AMs (=5×4) which are a portion of AMs of the A Side G.TRX installed on one side (e.g., left side) of the A side of the road, 25 AMs (=5×5) which are a portion of AMs of the A Side G.TRX installed on the other side (e.g., right side) of the A side of the road, 20 AMs (=5×4) which are a portion of AMs of the B Side G.TRX installed on one side (e.g., left side) of the B side of the road, and 25 AMs (=5×5) which are a portion of AMs of the B Side G.TRX installed on the other side (e.g., right side) of the B side of the road, may be used to form one cell.

The beam groups formed by four G.TRX sites form one cell through vertical overlapping (VO) and horizontal overlapping (HO).

Figure 13:
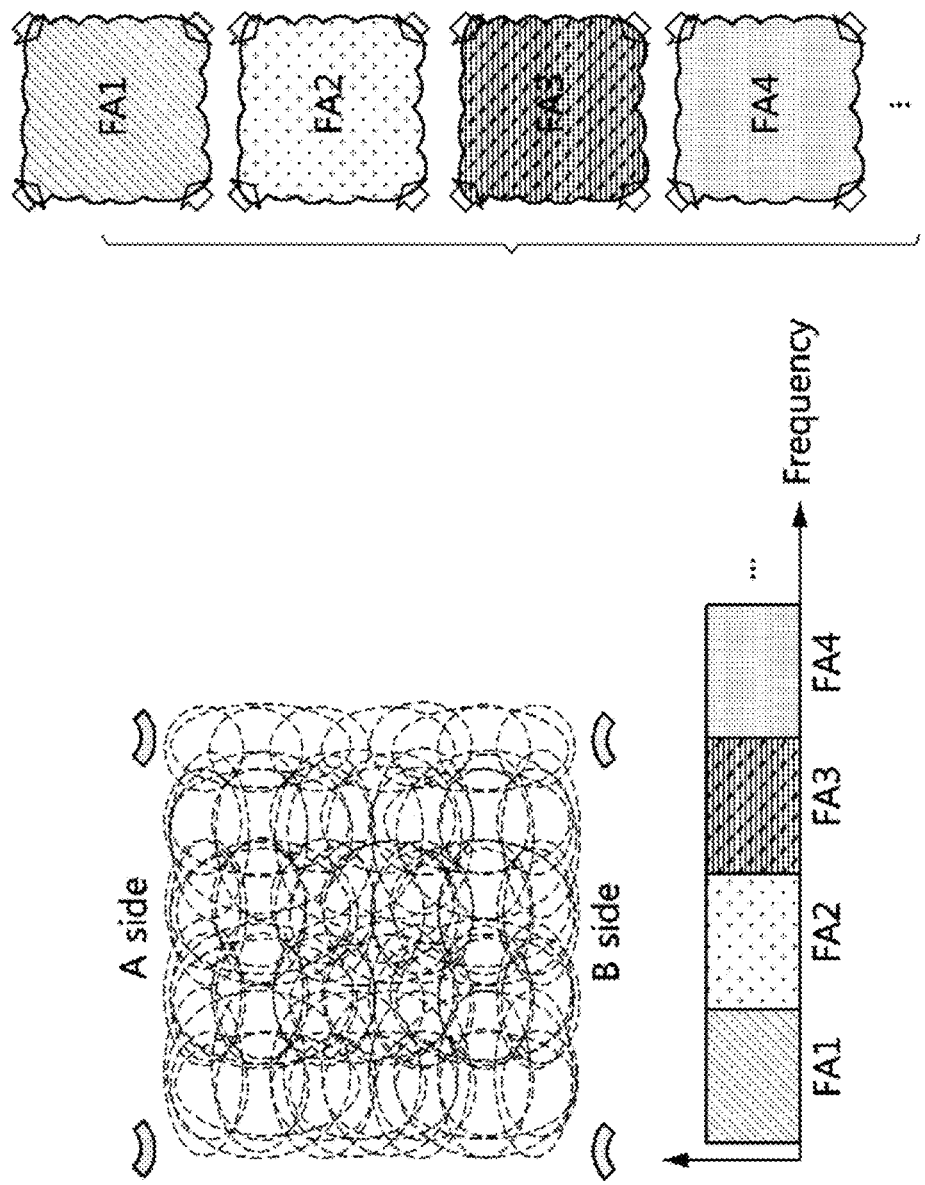
FIG. 13 is a conceptual diagram illustrating vertical overlapping and horizontal overlapping of the beam groups illustrated in FIG. 12.

FIG. 13 is a conceptual diagram illustrating vertical overlapping and horizontal overlapping of the beam groups illustrated in FIG. 12.

Referring to FIG. 13, a concept of forming a cell in a manner of vertically overlapping and horizontally overlapping the beam coverage groups formed using the AMs of the two G.TRXs installed on the A side of the road and the AMs of the two G.TRXs installed on the B side of the road is illustrated.

That is, the beam coverage groups of the left G.TRX on the A side of the road and the left G.TRX on the B side of the road overlap vertically, and the beam coverage groups of the right G.TRX on the A side of the road and the right G.TRX on the B side of the road overlap vertically. Also, the beam coverage groups formed by the left G.TRX and the right G.TRX on the A side of the road overlap horizontally, and the beam coverage groups formed by the left G.TRX and the right G.TRX on the B side of the road overlap horizontally. For all the beam coverages grouped into one cell, the content synchronization may be performed on the downlink, and uplink transmission may be received at multiple sites (two to four sites) among four sites.

Referring to FIG. 11, for example, if the beams corresponding to FA1 are grouped and operated as one cell, this one cell may be referred to as a 'BG FA1 A/B Side 4Site VO/HO Cell'. Here, 'BG' means a beam group, 'A/B Side' means a beam group formed by the AMs installed on both of the A side and the B side of the road, and '4Site' means that the beam group is formed by four G.TRX sites. In addition, 'VO (vertical overlap)' means that the beam group of the A Side G.TRX and the beam group of the B Side G.TRX overlap vertically, and 'HO (horizontally overlap)' means that the beam groups of the left and right G.TRXs overlap horizontally. Similarly, many cells such as 'BG FA2 A/B Side 4Site VO/HO Cell', 'BG FA3 A/B Side 4Site VO/HO Cell', and 'BG FA4 A/B Side 4Site VO/HO Cell' may exist in the same space at the same time. The beams grouped for each FA may be different.

Figure 14:
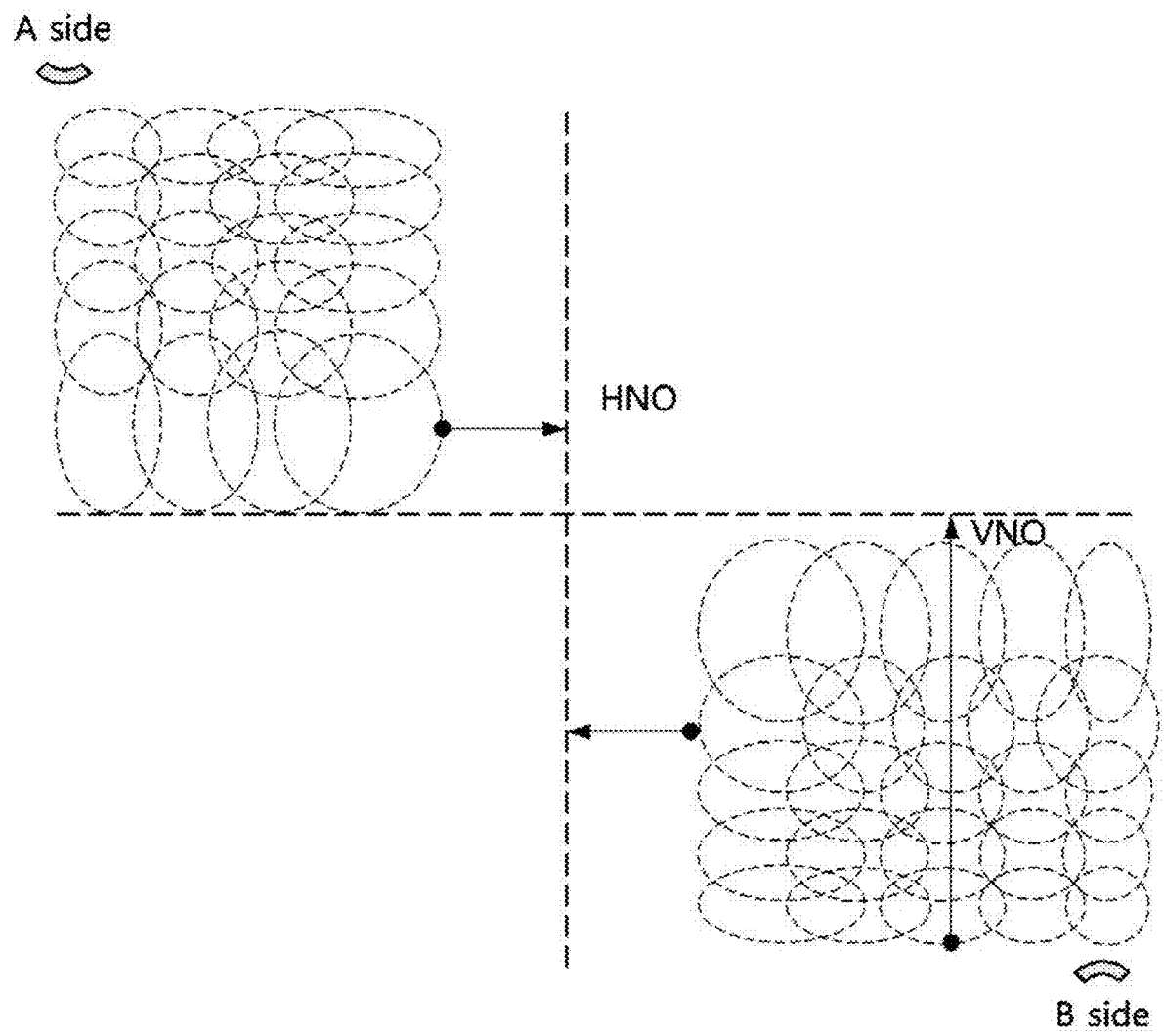
FIG. 14 is a conceptual diagram illustrating a first example of beam groups formed by AMs of two antenna assemblies according to an exemplary embodiment of the present disclosure.

FIG. 14 is a conceptual diagram illustrating a first example of beam groups formed by AMs of two antenna assemblies according to an exemplary embodiment of the present disclosure.

Referring to FIG. 14, one G.TRX exists on each of the A side and the B side of the road, and they may form one cell.

Specifically, one beam group formed by the G.TRX located on the A side of the road and one beam group formed by the G.TRX located on the B side of the road may be used at the same time to form one cell. The beam coverages (i.e., a total of 45 beam coverages), formed by 20 AMs (=5×4) which are a portion of 45 AMs of the G.TRX installed on one side (e.g., left side) of the A side of the road, and 25 AMs ((=5×5) which are a portion of 45 AMs of the G.TRX installed on the other side (e.g., right side) of the B side of the road, may be used to form one cell.

The beam groups formed by two G.TRX sites form one cell through vertical non-overlapping (VNO) and horizontal non-overlapping (HNO).

Figure 15:
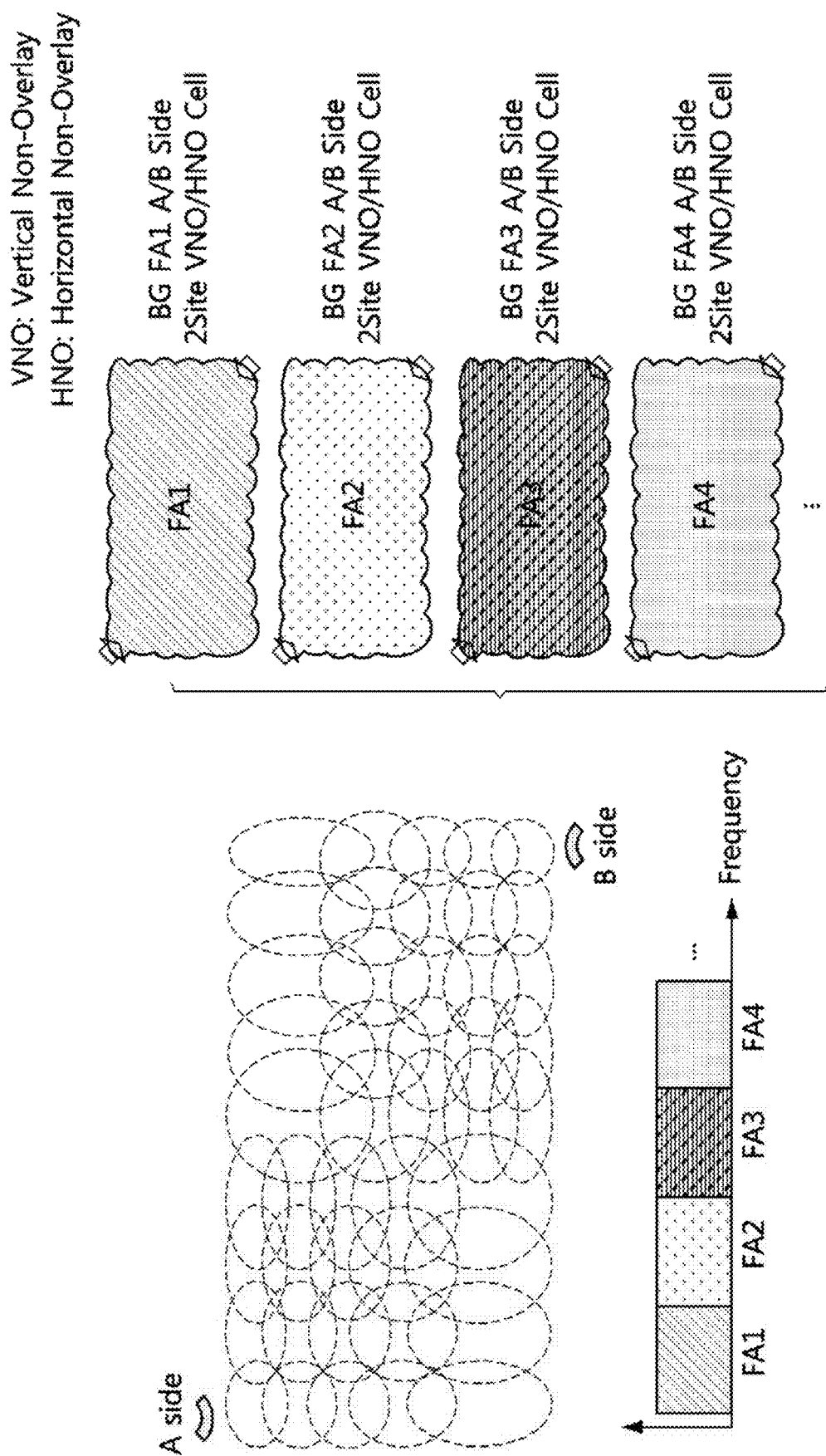
FIG. 15 is a conceptual diagram illustrating vertical non-overlapping and horizontal non-overlapping of the beam groups illustrated in FIG. 14.

FIG. 15 is a conceptual diagram illustrating vertical non-overlapping and horizontal non-overlapping of the beam groups illustrated in FIG. 14.

Referring to FIG. 15, a concept of forming a cell in a manner of vertically not overlapping and horizontally not overlapping the beam coverage groups formed using the AMs of the G.TRX installed on the A side of the road and the AMs of the G.TRX installed on the B side of the road is illustrated.

That is, the beam coverage groups of the left G.TRX on the A side of the road and the right G.TRX on the B side of the road do not overlap vertically and do not overlap horizontally. The G.TRXs on both of the A and B sides do not face each other. That is, two beam coverage groups of the G.TRX installed on the A side of the road and the G.TRX installed on the B side of the road may be arranged so they do not overlap vertically and do not overlap horizontally. For all the beam coverages grouped into one cell, the content synchronization may be performed on the downlink, and uplink transmission may be received at multiple sites (two sites).

Referring to FIG. 15, for example, if the beams corresponding to FA1 are grouped and operated as one cell, this one cell may be referred to as a 'BG FA1 A/B Side 2Site VNO/HNO Cell'. Here, 'BG' means a beam group, 'A/B Side' means a beam group formed by the AMs installed on both of the A side and the B side of the road, and '2Site' means that the beam group is formed by two G.TRX sites. In addition, 'VNO (vertical non-overlap)' means that the beam group of the A Side G.TRX and the beam group of the B Side G.TRX do not overlap vertically, and 'HNO (horizontally non-overlap)' means that the beam groups of the left and right G.TRXs do not overlap horizontally. Similarly, many cells such as 'BG FA2 A/B Side 2Site VNO/HNO Cell', 'BG FA3 A/B Side 2Site VNO/HNO Cell', and 'BG FA4 A/B Side 2Site VNO/HNO Cell' may exist in the same space at the same time. The beams grouped for each FA may be different.

Figure 16:
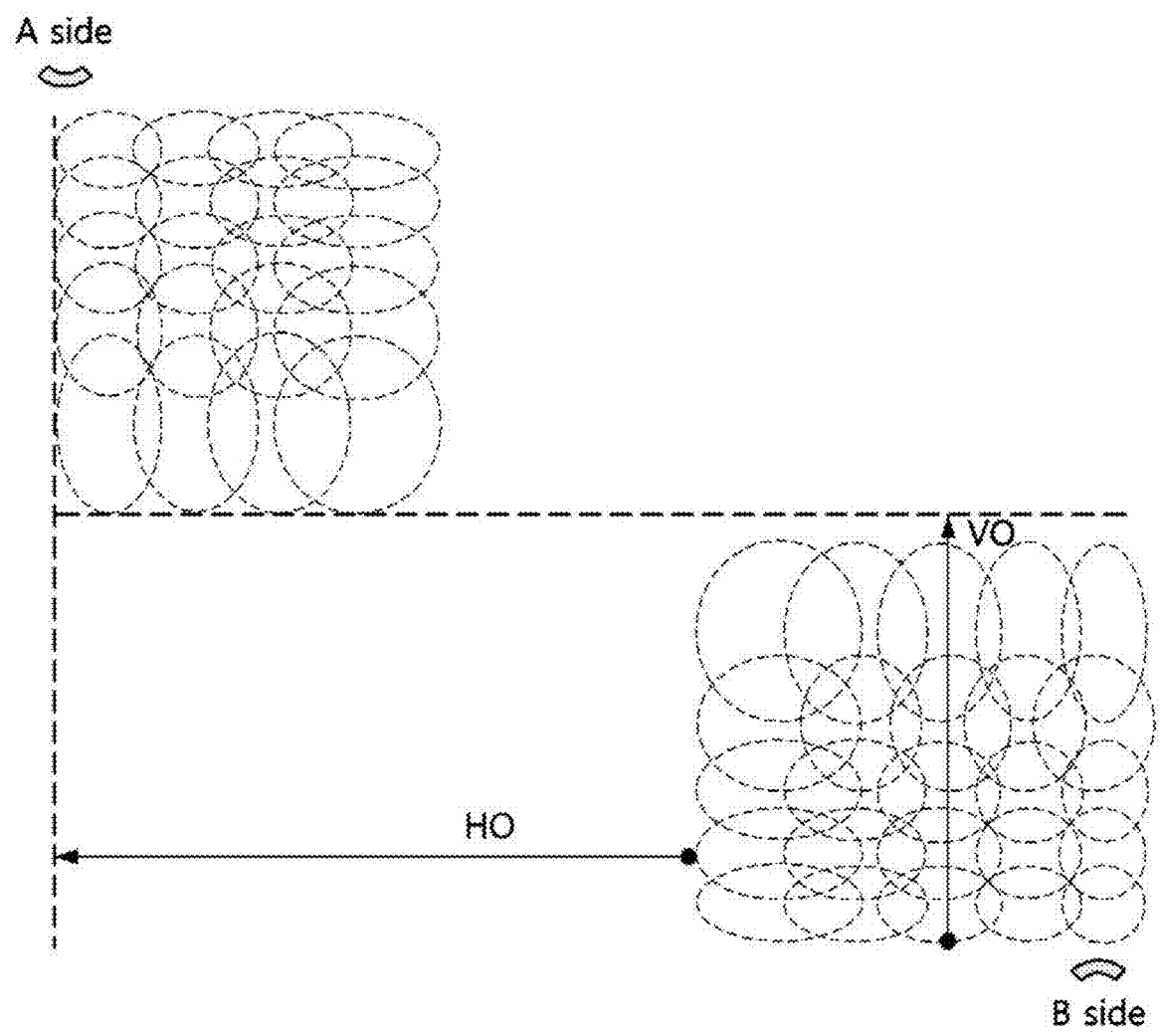
FIG. 16 is a conceptual diagram illustrating a second example of beam groups formed by AMs of two antenna assemblies according to an exemplary embodiment of the present disclosure.

FIG. 16 is a conceptual diagram illustrating a second example of beam groups formed by AMs of two antenna assemblies according to an exemplary embodiment of the present disclosure.

Referring to FIG. 16, one G.TRX exists on each of the A side and the B side of the road, and they may form one cell.

Specifically, one beam group formed by the G.TRX located on the A side of the road and one beam group formed by the G.TRX located on the B side of the road may be used at the same time to form one cell. The beam coverages (i.e., a total of 45 beam coverages), formed by 20 AMs (=5×4) which are a portion of 45 AMs of the G.TRX installed on one side (e.g., left side) of the A side of the road, and 25 AMs ((=5×5) which are a portion of 45 AMs of the G.TRX installed on the other side (e.g., right side) of the B side of the road, may be used to form one cell.

The beam groups formed by two G.TRX sites form one cell through vertical overlapping (VO) and horizontal overlapping (HO).

FIG. 17 is a conceptual diagram illustrating vertical overlapping and horizontal overlapping of the beam groups illustrated in FIG. 16.

Referring to FIG. 17, a concept of forming a cell in a manner of vertically overlapping and horizontally overlapping the beam coverage groups formed using the AMs of the G.TRX installed on the A side of the road and the AMs of the G.TRX installed on the B side of the road is illustrated.

That is, the beam coverage groups of the left G.TRX on the A side of the road and the right G.TRX on the B side of the road overlap vertically and overlap horizontally. The G.TRXs on both of the A and B sides do not face each other. That is, two beam coverage groups of the G.TRX installed on the A side of the road and the G.TRX installed on the B side of the road may be arranged so they overlap vertically and overlap horizontally. For all the beam coverages grouped into one cell, the content synchronization may be performed on the downlink, and uplink transmission may be received at multiple sites (two sites).

Referring to FIG. 17, for example, if the beams corresponding to FA1 are grouped and operated as one cell, this one cell may be referred to as a 'BG FA1 A/B Side 2Site VO/HO Cell'. Here, 'BG' means a beam group, 'A/B Side' means a beam group formed by the AMs installed on both of the A side and the B side of the road, and '2Site' means that the beam group is formed by two G.TRX sites. In addition, 'VO (vertical overlap)' means that the beam group of the A Side G.TRX and the beam group of the B Side G.TRX overlap vertically, and 'HO (horizontally overlap)' means that the beam groups of the left and right G.TRXs overlap horizontally. Similarly, many cells such as 'BG FA2 A/B Side 2Site VO/HO Cell', 'BG FA3 A/B Side 2Site VO/HO Cell', and 'BG FA4 A/B Side 2Site VO/HO Cell' may exist in the same space at the same time. The beams grouped for each FA may be different.

Installation Types of Antenna Assembly

Figure 18:
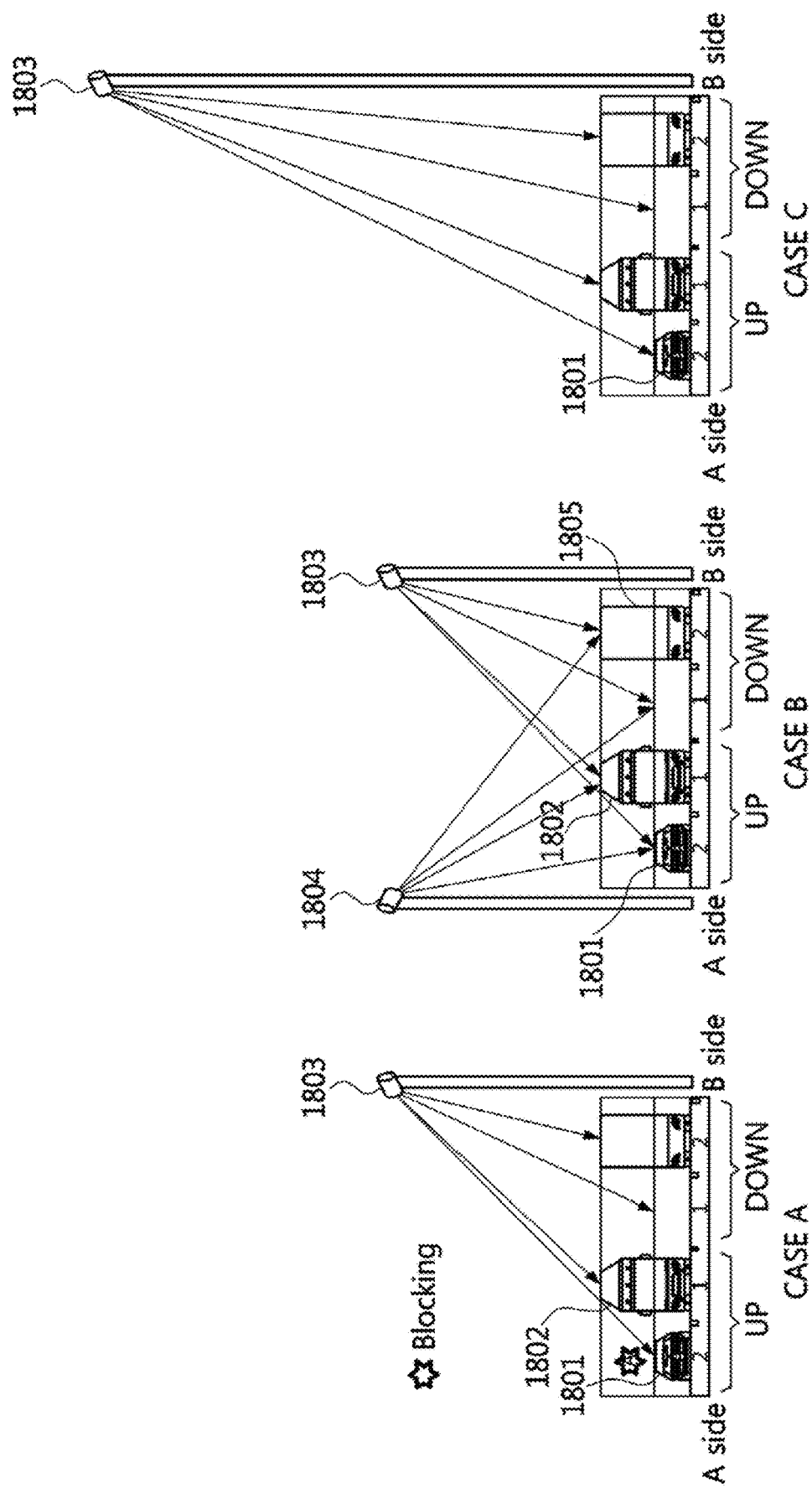
FIG. 18 is a conceptual diagram illustrating installation types of antenna assemblies according to an exemplary embodiment of the present disclosure.

FIG. 18 is a conceptual diagram illustrating installation types of antenna assemblies according to an exemplary embodiment of the present disclosure.

Referring to FIG. 18, various installation types of the antenna assemblies disposed around a moving path of moving objects are illustrated. First, CASE A is a case where a G.TRX is installed only on one side (e.g., B side) of the road at the same height in terms of blocking of a radio wave. Also, CASE B is a case where two G.TRXs are installed at the same height on both sides of the road. Finally, CASE C is a case where a G.TRX is installed only on one side (e.g., B side) of the road, but the G.TRX is installed at a higher position than CASE A and CASE B.

Assuming a total of four lanes (two upward lanes and two downward lanes), when a passenger car, a bus, and a truck exist in the same cross section, in CASE A, communications between a passenger car 1801 and a B Side G.TRX 1803 may be blocked by a bus 1802. However, in CASE B, although communications between the passenger car 1801 and the B Side G.TRX 1803 may be blocked by the bus 1802, but a communication link with an A Side G.TRX 1804 may be secured. Meanwhile, the bus 1802 and a truck 1805 may increase signal-to-noise ratio (SNR) by securing two communication links with the A Side G.TRX 1804 and the B Side G.TRX 1803, respectively. Finally, in CASE C, even when the G.TRX 1803 is installed only on one side (e.g., B side) of the road, a communication link to the passenger car 1801 may be secured.

A cell may be formed without blocking using the various cell formation methods described above, and it may be considered to increase the installation height of the G.TRX.

Figure 19:
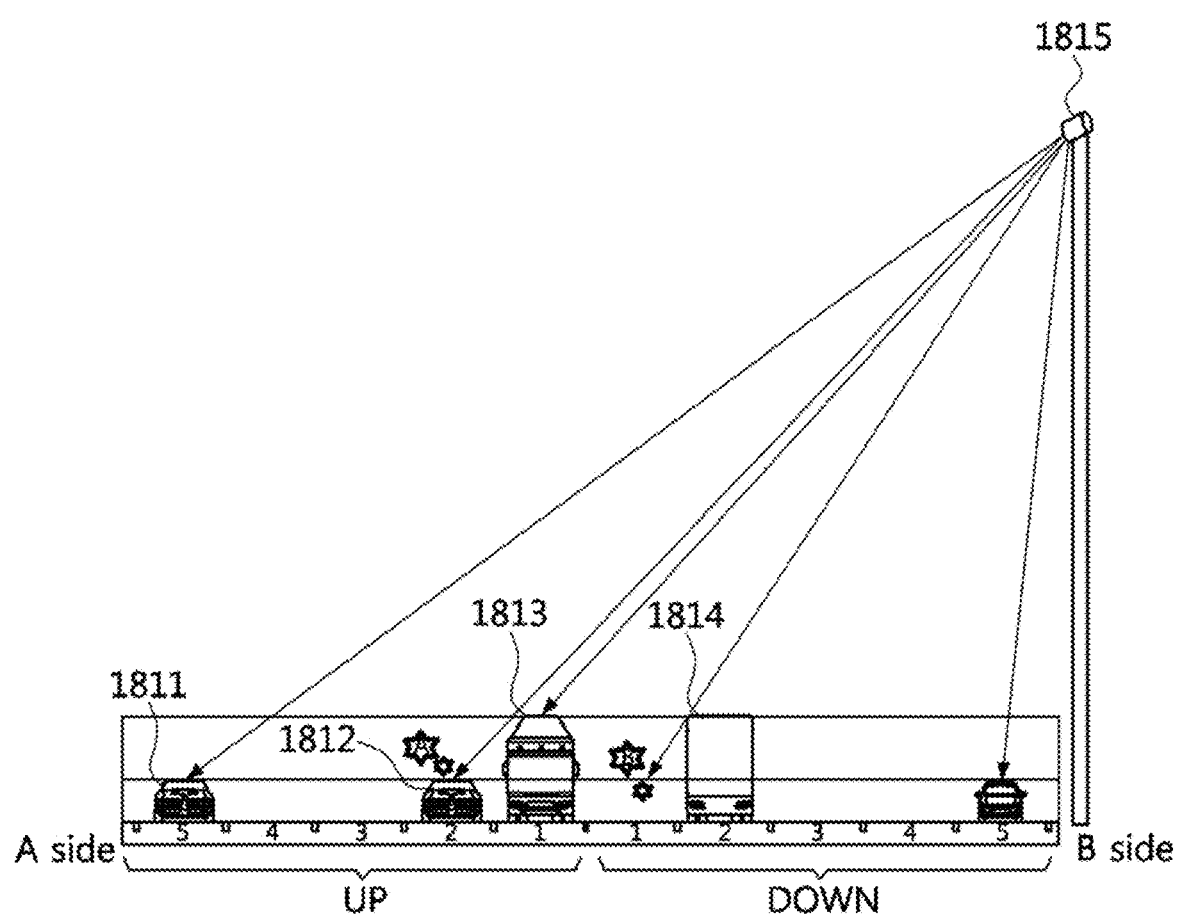
FIG. 19 is a conceptual diagram illustrating blocking according to a road width in an installation type of antenna assemblies according to an embodiment of the present invention.

FIG. 19 is a conceptual diagram illustrating blocking according to a road width in an installation type of antenna assemblies according to an embodiment of the present invention.

Referring to FIG. 19, even when the installation height of the G.TRX is doubled than CASE A and CASE B of FIG. 18, blocking may occur again as the road becomes wider.

For example, assuming a total of ten lanes (five upward lanes and five downward lanes), when passenger cars 1811 and 1812, a bus 1813, and a truck 1814 exist in the same cross section, communication between the passenger car 1812 in the second upward lane and the G.TRX 1815 installed on the B side may be blocked due to the bus 1813 in the first upward lane (blocking A). Also, when a passenger car exists in the first downward lane, communication between the passenger car and the G.TRX 1815 installed on the B side may be blocked due to the truck 1814 in the second downward lane (blocking B).

That is, even when the antenna assembly is installed only on one side of the road, blocking may or may not occur depending on the road width and a driving situation of the vehicles operated at a specific time. If blocking occurs, a solution of increasing the installation height of the G.TRX or installing an additional G.TRX on the opposite side of the road may be considered. Therefore, in order to avoid blocking in any vehicle driving situations, an antenna assembly installation type that minimizes capital expenditure (CAPEX) and operating expenditure (OPEX) may be selected in consideration of the various cell formation methods mentioned above, properties of a backbone wired network installed on the road, and the installation height of the G.TRX.

Road Environment and Installation Environment

Figure 22:
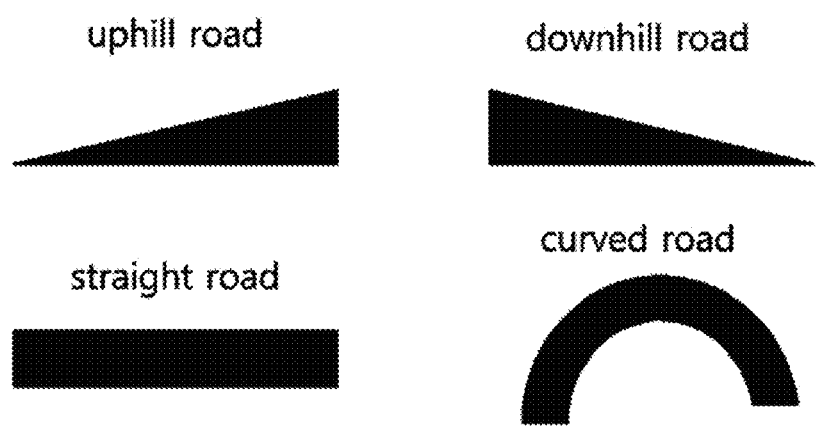

FIGS. 20 to 22 are conceptual diagrams illustrating various road environments to which installation types of antenna assemblies according to an exemplary embodiment of the present disclosure are applied.

Referring to FIG. 20, there may be various road environments in which road widths are changed, such as lane increase (CASE A), lane branch (CASE B), lane reduction (CASE C), and lane merge (CASE D). Therefore, the aforementioned various cell formation methods should be considered and applied for these four cases (CASE A, CASE B, CASE C, and CASE D).

Referring to FIG. 21, ecological road, tunnel, or anti-noise barrier may be installed as shown in CASE A, and three-dimensional roads may cross each other as shown in CASE B.

In CASE A, since blocking is expected, G.TRXs may be installed inside the ecological road, inside the tunnel, or inside the anti-noise barrier in consideration of the aforementioned various cell formation methods. In CASE B, frequency separation may be considered so that interferences between a cell used in the upper road and a cell used in the lower road does not influence each other.

Referring to FIG. 22, it should be considered in the cell formation that the coverage and blocking condition may vary even in the same vehicle driving situation depending on whether the road environment is uphill or downhill. Further, so far, only straight roads have been considered, but these environments should also be considered in the cell formation because the coverage and blocking condition may vary depending on a curvature of a curved road.

FIGS. 23 to 26 are conceptual diagrams illustrating various installation environments of antenna assemblies according to an exemplary embodiment of the present disclosure.

Figure 23:
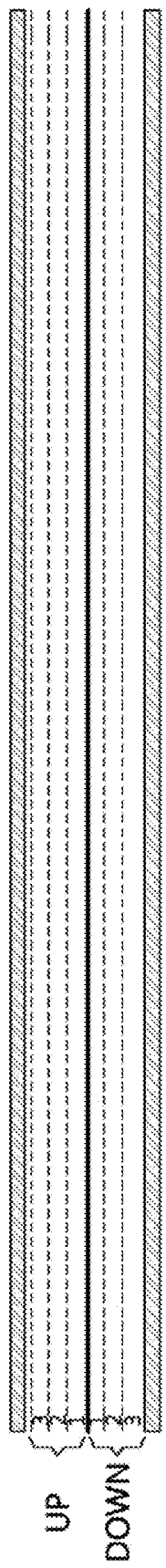
FIGS. 23 to 26 are conceptual diagrams illustrating various installation environments of antenna assemblies according to an exemplary embodiment of the present disclosure.

Referring to FIG. 23, there is shown a road environment in which no street-light exists. In this case, in order to install a G.TRX according to an exemplary embodiment of the present disclosure, a pole should be installed, and thus, a cost addition corresponding to CAPEX and OPEX should be considered in the cell formation method.

Figure 24:
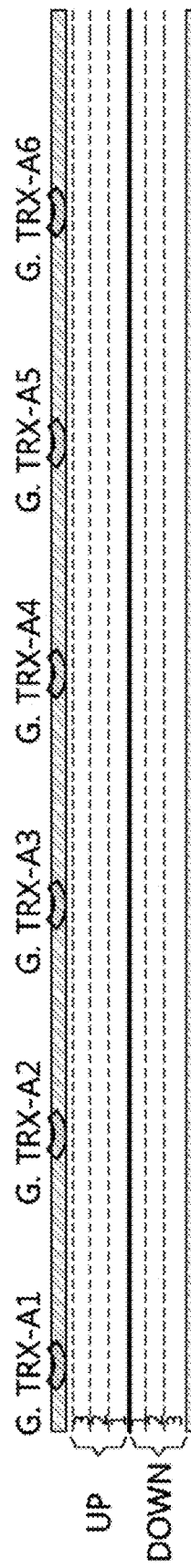

Referring to FIG. 24, a road environment in which street-lights are disposed at equal intervals on one side (e.g., A side) of the road is illustrated. Basically, in such the road environment, the street-light has a sufficient height and is supplied with electricity, so it is easy to install the G.TRX simply by connecting a communication infrastructure thereto. Therefore, various cell formation methods may be applied in consideration of cost reduction in terms of CAPEX and OPEX.

Figure 25:
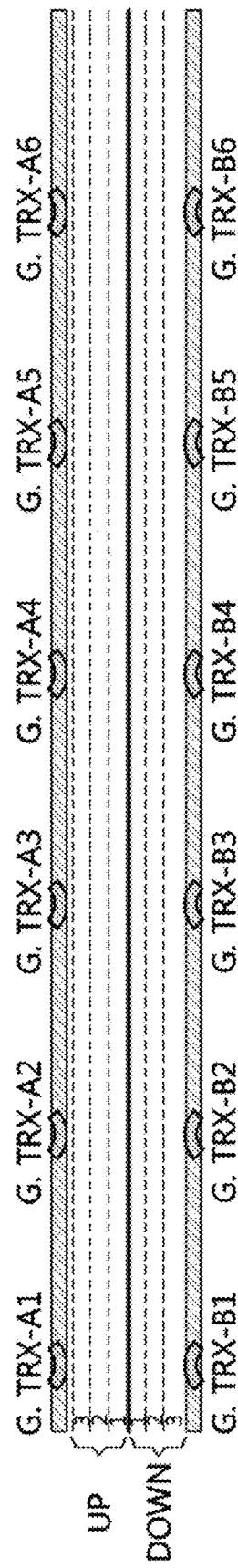

Referring to FIG. 25, a road environment in which street-lights exist at equal intervals on both sides (e.g., A side and B side) of a road is illustrated. In this case, the street-lights on both sides may be installed in form of face-to-face at equal intervals. Basically, in such the road environment, the street-light has a sufficient height and is supplied with electricity, so it is easy to install the G.TRX simply by connecting a communication infrastructure thereto. Therefore, various cell formation methods may be applied in consideration of cost reduction in terms of CAPEX and OPEX.

Figure 26:
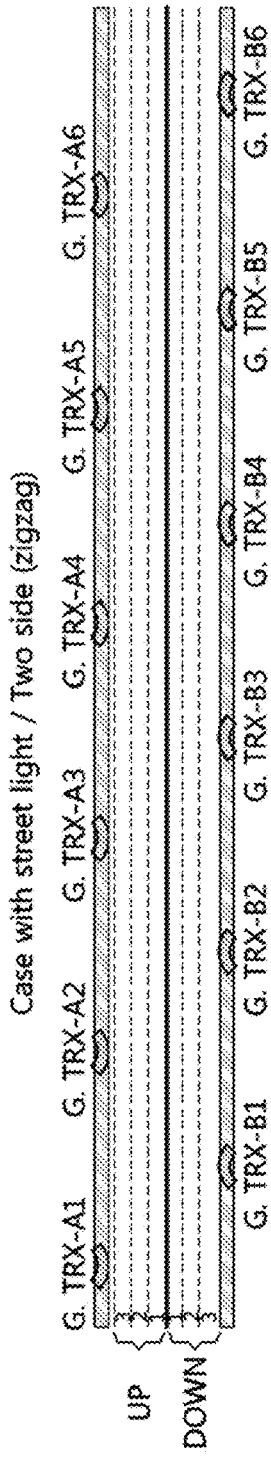

Referring to FIG. 26, a road environment in which street-lights exist at equal intervals on both sides (e.g., A side and B side) of a road is illustrated. However, unlike the road environment of FIG. 25, the street-lights on both sides may be installed in a zigzag form at equal intervals. Basically, in such the road environment, the street-light has a sufficient height and is supplied with electricity, so it is easy to install the G.TRX simply by connecting a communication infrastructure thereto. Therefore, various cell formation methods may be applied in consideration of cost reduction in terms of CAPEX and OPEX.

DU/CU Mapping of Antenna Assembly

Figure 27A:
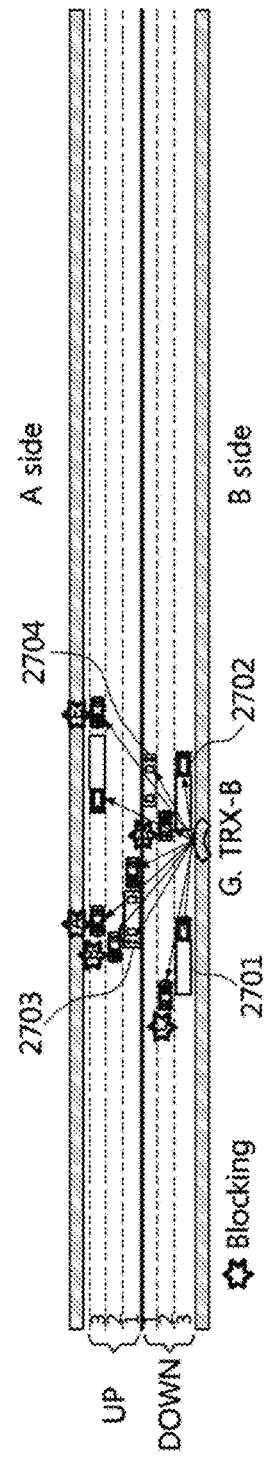
FIGS. 27A and 27B are conceptual diagrams illustrating a first example of DU-CU mapping for an antenna assembly according to an exemplary embodiment of the present disclosure.
Figure 27B:
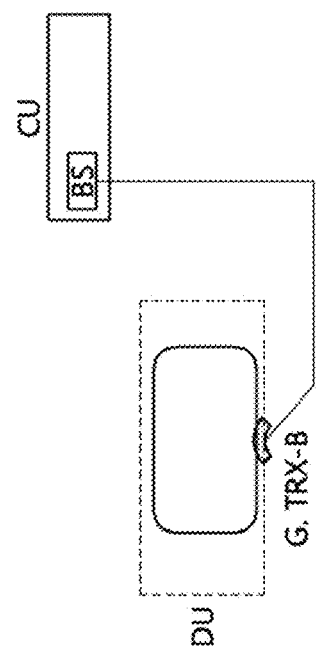

FIGS. 27A and 27B are conceptual diagrams illustrating a first example of DU-CU mapping for an antenna assembly according to an exemplary embodiment of the present disclosure.

Referring to FIG. 27A, a blocking in the assumed vehicle driving environment when a link is provided by the G.TRX (i.e., G.TRX-B) installed on one side (e.g., B side) of the road is illustrated. For example, blocking A, B, C, D and E may occur by trucks 2701 and 2702 and buses 2703 and 2704.

Referring to FIG. 27B, there is illustrated a beam coverage group formed by G.TRX-B and a base station. In this case, G.TRX-B may correspond to a type of distributed unit (DU), and the base station may be mapped to a central unit (CU). That is, all the 45 AMs belonging to one G.TRX (i.e., G.TRX-B) may be operated belonging to one base station.

Figure 28A:
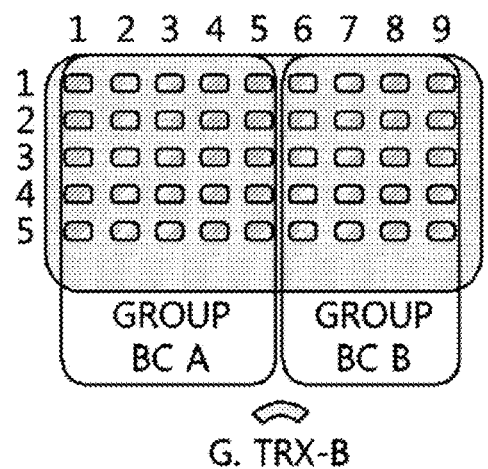
FIGS. 28A and 28B are conceptual diagrams illustrating a second example of DU-CU mapping for an antenna assembly according to an exemplary embodiment of the present disclosure.
Figure 28B:
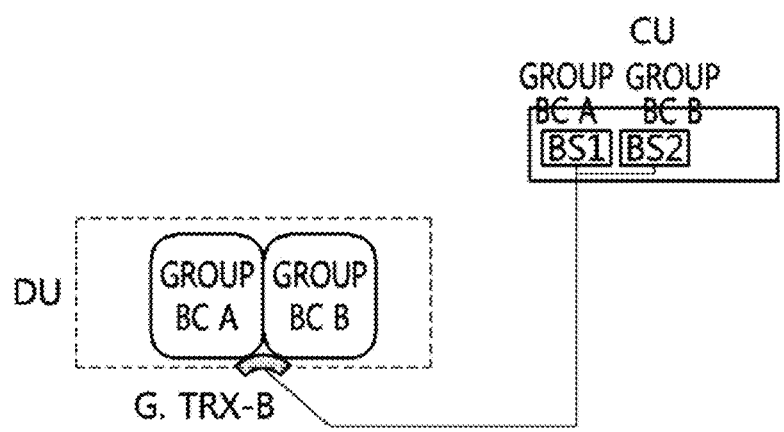

FIGS. 28A and 28B are conceptual diagrams illustrating a second example of DU-CU mapping for an antenna assembly according to an exemplary embodiment of the present disclosure.

Figure 45:
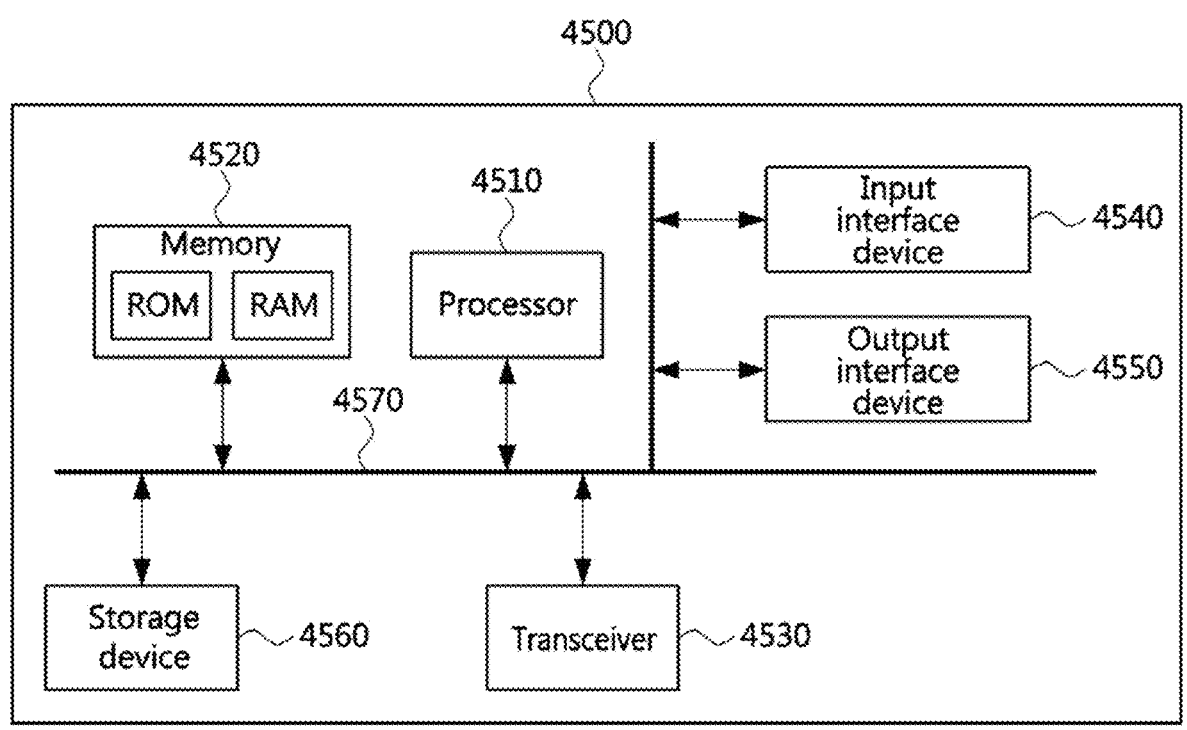
FIG. 45 is a block diagram illustrating a configuration of an apparatus capable of performing a method according to exemplary embodiments of the present disclosure.

Referring to FIG. 28A, 45 AMs belonging to one G.TRX (i.e., G.TRX-B) may be divided into two regions. The 25 AMs from the first to fifth columns may cover a beam coverage group A region, and the 20 AMs from the sixth to ninth columns may cover a beam coverage group B region.

Referring to FIG. 28B, the beam coverage group A region may belong to and be managed by a base station 1 (BS1), and the beam coverage group B region may belong to and be managed by a base station 2 (BS2). In this case, the base stations 1 and 2 are logical concepts in the CU, and may be operated in different FAs. Also, the regions covered by the base station 1 and the base station 2 may vary with time.

FIGS. 29A and 29B are conceptual diagrams illustrating a third example of DU-CU mapping for an antenna assembly according to an exemplary embodiment of the present disclosure.

Referring to FIG. 29A, unlike the case of FIG. 27A, links may be provided by two G.TRXs (i.e., G.TRX-A and G.TRX-B) installed on both sides (i.e., A side and B side) of the road. Unlike in the case of FIG. 27A, among the blocking A, B, C, D, and E by the trucks 2701 and 2702 and the buses 2703 and 2704, the blocking A, B, D, and E except the blocking C may be eliminated by G.TRX-A.

Referring to FIG. 29B, a beam coverage group formed by G.TRX-A and a beam coverage group formed by G.TRX-B may be vertically overlapped to form one cell, and the formed cell may be managed by one base station. Each of G.TRX-A and G.TRX-B may correspond to a type of DU, and the base station may be mapped to a CU. That is, all the 90 AMs belonging to two G.TRXs may belong to and be operated by one base station.

Figure 30B:
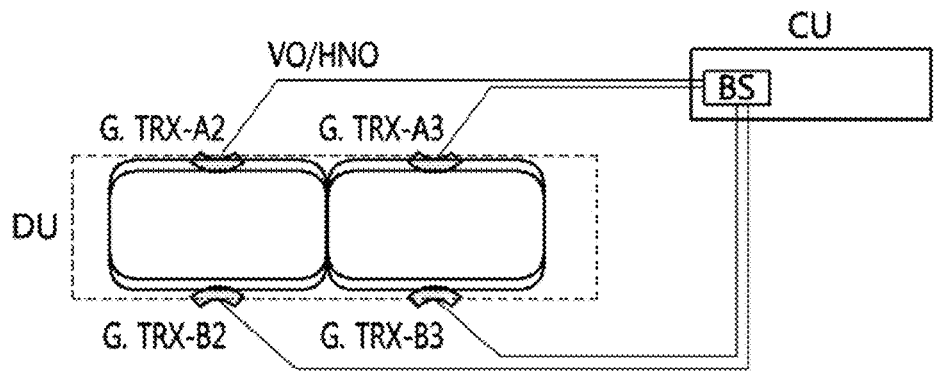
Figure 30C:
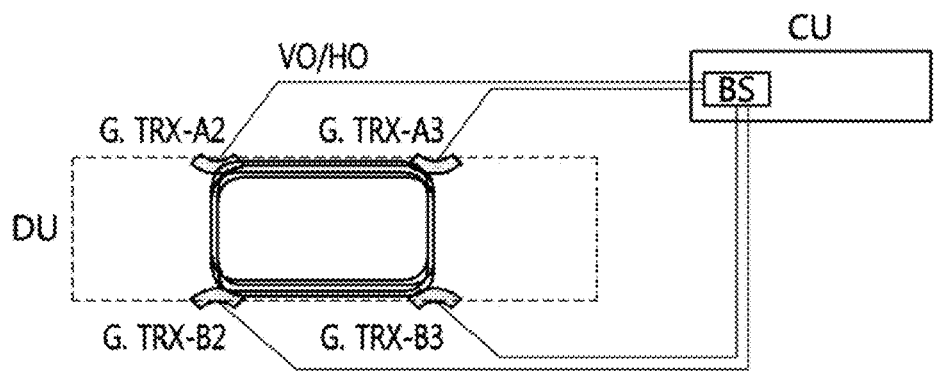

FIGS. 30A to 30C are conceptual diagrams illustrating a fourth example of DU-CU mapping for an antenna assembly according to an exemplary embodiment of the present disclosure.

Referring to FIG. 30A, in the same environment as that shown in FIGS. 27A and 28A, links may be provided by two G.TRXs (i.e., G.TRX-A2 and G.TRX-A3) installed on one side (e.g., A side) of the road and two G.TRXs (i.e., G.TRX-B2 and G.TRX-B3) installed on the other side (e.g., B side) of the road. In this case, by using four G.TRXs, the blocking C which is not solved in FIG. 29A may be eliminated by a link provided by the G.TRX-A2.

Referring to FIG. 30B, the beam coverage group formed by G.TRX-A2 and the beam coverage group formed by G.TRX-B2 may be arranged in a vertically overlapping (VO) form. Similarly, the beam coverage group formed by G.TRX-A3 and the beam coverage group formed by G.TRX-B3 may be arranged in a vertically overlapping (VO) form. On the other hand, the two beam coverage groups of G.TRX-A2 and G.TRX-A3 may be arranged in a horizontally non-overlapping (HNO) form, and the two beam coverage groups of G.TRX-B2 and G.TRX-B3 may also be arranged in a horizontally non-overlapping (HNO) form. One cell may be formed by a total of four beam coverage groups, and the formed cell may be managed by one base station. Each of G.TRX-A2, G.TRX-A3, G.TRX-B2, and G.TRX-B3 may correspond to a type of DU, and the base station may be mapped to a CU. That is, all the 180 AMs belonging to four G.TRXs may belong to and be operated by one base station.

Referring to FIG. 30C, a partial beam coverage group formed by G.TRX-A2 (e.g., a beam coverage group formed by 20 AMs among a total of 45 AMs) and a partial beam coverage group formed by G.TRX-B2 (e.g., a beam coverage group formed by 20 AMs among a total of 45 AMs) may be arranged in a vertically overlapping (VO) form. Similarly, a partial beam coverage group formed by G.TRX-A3 (e.g., a beam coverage group formed by 25 AMs among a total of 45 AMs) and a partial beam coverage group formed by G.TRX-B3 (e.g., a beam coverage group formed by 25 AMs among a total of 45 AMs) may be arranged in a vertically overlapping (VO) form. Also, partial beam coverage groups formed by G.TRX-A2 and G.TRX-A3 may be arranged in a horizontally overlapping (HO) form, and partial beam coverage groups formed by G.TRX-B2 and G.TRX-B3 may be arranged in a horizontally overlapping (HO) form. That is, one cell may be formed by a total of four partial beam coverage groups, and the formed cell may be managed by one base station. Each of G.TRX-A2, G.TRX-A3, G.TRX-B2, and G.TRX-B3 may correspond to a type of DU, and the base station may be mapped to a CU. That is, 90 AMs, a portion of all the AMs belonging to four G.TRXs, may belong to and be operated by one base station.

Figure 31A:
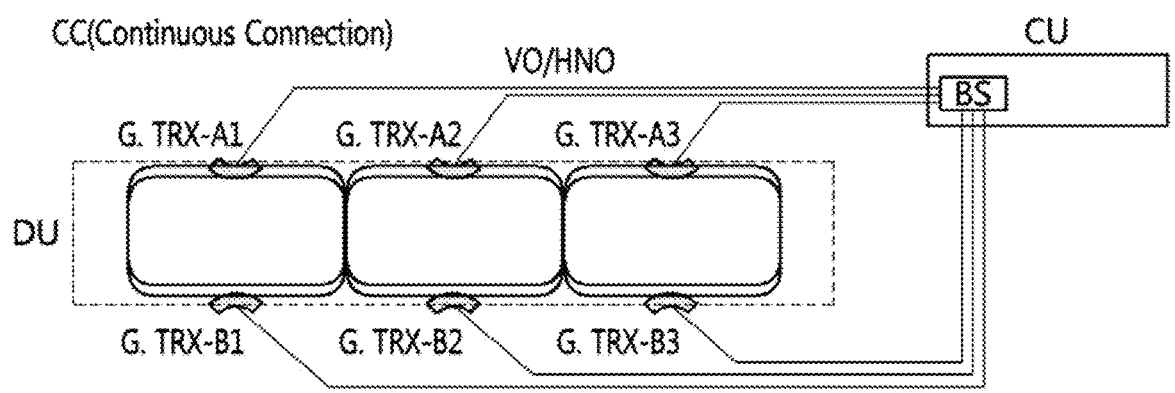
FIGS. 31A and 31B are conceptual diagrams illustrating a fifth example of DU-CU mapping for an antenna assembly according to an exemplary embodiment of the present disclosure.
Figure 31B:
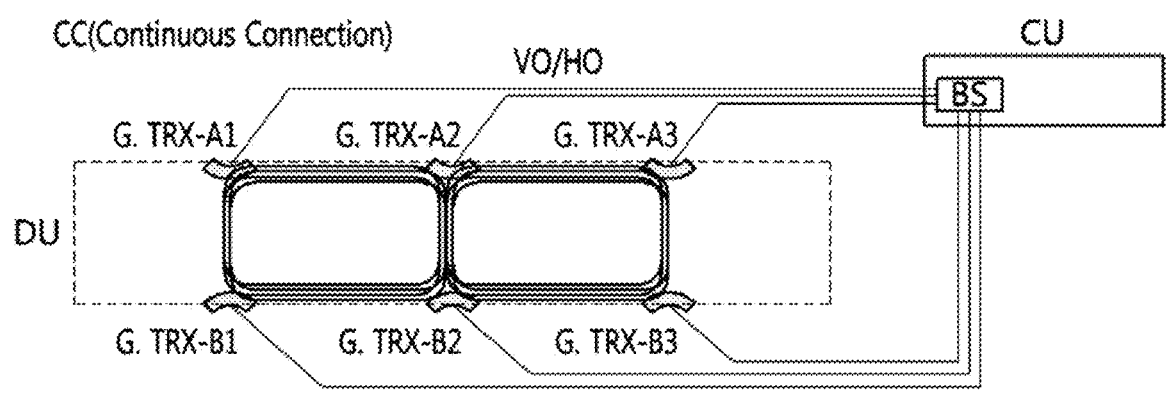

FIGS. 31A and 31B are conceptual diagrams illustrating a fifth example of DU-CU mapping for an antenna assembly according to an exemplary embodiment of the present disclosure.

Referring to FIG. 31A, a case, in which G.TRX-A1 and G.TRX-B1 are added to extend a cell region compared to the case illustrated in FIG. 30B, is illustrated. For example, a total of three G.TRXs may be installed on one side (e.g., A side) of the road, and a total of three G.TRXs may be installed on the other side (e.g., B side) of the road. In this case, one cell may be formed by a total of 270 (=45×6) AMs, and the formed cell may be managed by one logical base station. Compared to the case illustrated in FIG. 30B, since two additional G.TRXs are installed in each side of the road to extend the cell region, this may be defined as a concept of 'continuous connection (CC)'. In this manner, the cell region illustrated in FIG. 30B may be extended through the continuous connection.

Referring to FIG. 31B, a case, in which some AMs of G.TRX-A1 and G.TRX-B1 are added to extend a cell region compared to the case illustrated in FIG. 30C, is illustrated. For example, a total of three G.TRXs may be installed on one side (e.g., A side) of the road, and a total of three G.TRXs may be installed on the other side (e.g., B side) of the road. In this case, one cell may be formed by a total of 180 AMs (e.g., 25 AMs from G.TRX-A1, 25 AMs from G.TRX-B1, 45 AMs from G.TRX-A2, 45 AMs from G.TRX-B2, 20 AMs from G.TRX-A3, and 20 AMs from G.TRX-B3), and the formed cell may be managed by one logical base station. Compared to the case illustrated in FIG. 30C, since two additional G.TRXs are installed in each side of the road to extend the cell region, this may be defined as a concept of 'continuous connection (CC)'. In this manner, the cell region illustrated in FIG. 30C may be extended through the continuous connection.

Figure 32A:
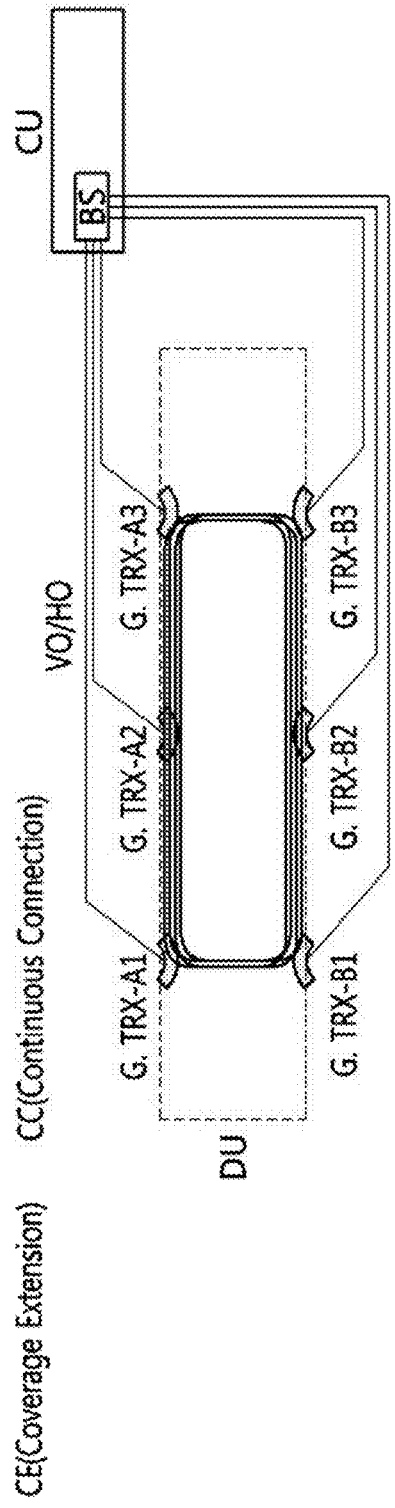
FIGS. 32A and 32B are conceptual diagrams illustrating a sixth example of DU-CU mapping for an antenna assembly according to an exemplary embodiment of the present disclosure.
Figure 32B:
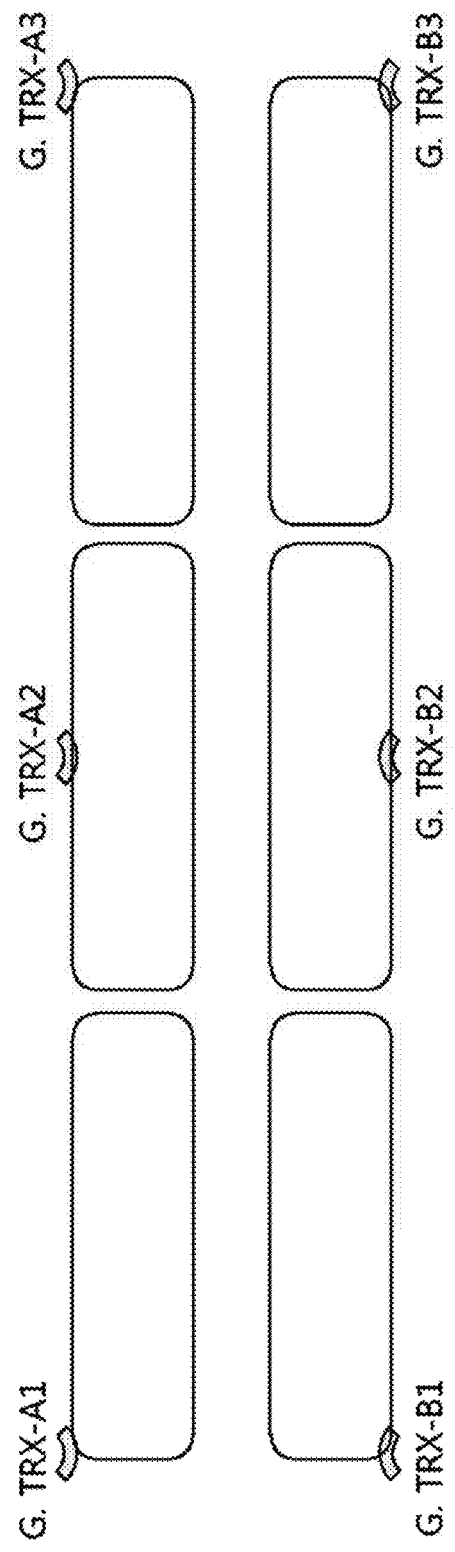

FIGS. 32A and 32B are conceptual diagrams illustrating a sixth example of DU-CU mapping for an antenna assembly according to an exemplary embodiment of the present disclosure.

Referring to FIG. 32A, a part of beam coverage regions of G.TRX-A1 and G.TRX-B1 may be extended from the center point of G.TRX-A1 to the center point of G.TRX-A3. In this case, the coverage may be extended through beam width extension without changing the number of AMs of each G.TRX. Alternatively, the coverage may be extended by additionally utilizing AMs. Also, as in the method described with reference to FIG. 4, it may be possible to take charge of coverage through power and weight/phase control. Similarly, the entire beam coverage regions of G.TRX-A2 and G.TRX-B2 may be extended from the center point of G.TRX-A1 to the center point of G.TRX-A3. In this case, the coverage may be extended through beam width extension without changing the number of AMs of each G.TRX. Alternatively, the coverage may be extended by additionally utilizing AMs. Also, as in the method described with reference to FIG. 4, it may be possible to take charge of coverage through power and weight/phase control. Similarly, a part of the beam coverage regions of G.TRX-A3 and G.TRX-B3 may be extended from the center point of G.TRX-A1 to the center point of G.TRX-A3. In this case, the coverage may be extended through beam width extension without changing the number of AMs of each G.TRX. Alternatively, the coverage may be extended by additionally utilizing AMs. Also, as in the method described with reference to FIG. 4, it may be possible to take charge of coverage through power and weight/phase control. In this case, beam coverage groups formed by six G.TRXs forms one cell (e.g., one cell corresponding to FA1) and the formed cell may be managed by one logical base station. Referring to FIG. 32B, a shape of the beam coverage group formed by each of the six G.TRXs is illustrated.

Meanwhile, in the above-described cases, it is assumed that the G.TRXs are installed on both sides of the road so as to face each other. Hereinafter, it is assumed that the G.TRXs are installed in the zigzag form on both sides of the road.

Figure 33A:
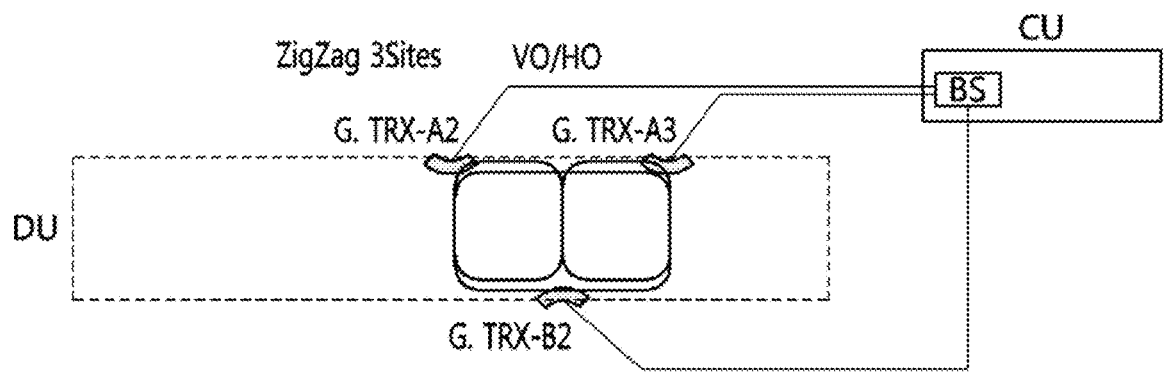
FIGS. 33A and 33B are conceptual diagrams illustrating a seventh example of DU-CU mapping for an antenna assembly according to an exemplary embodiment of the present disclosure.
Figure 33B:
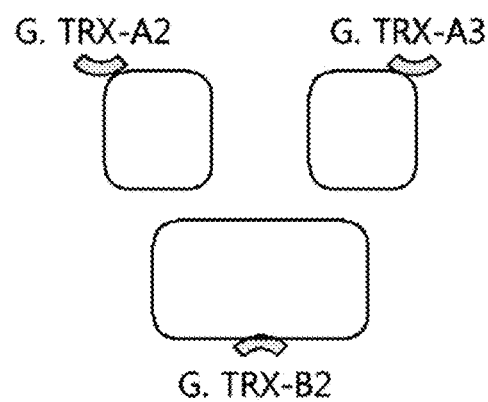

FIGS. 33A and 33B are conceptual diagrams illustrating a seventh example of DU-CU mapping for an antenna assembly according to an exemplary embodiment of the present disclosure.

Referring to FIG. 33A, two G.TRXs (i.e., G.TRX-A2 and G.TRX-A3) installed on one side (e.g., A side) of the road and one G.TRX (i.e., G.TRX-B2) installed on the other side (e.g., B side) of the road may form one cell (e.g., one cell corresponding to FA1). The formed cell may be managed by one logical base station. In this case, partial beam coverage regions of G.TRX-A2 and G.TRX-A3 and the entire beam coverage region of G.TRX-B2 may be combined to be managed and operated as one cell. Referring to FIG. 33B, a shape of the beam coverage group formed by each of the three G.TRXs is illustrated.

Figure 34A:
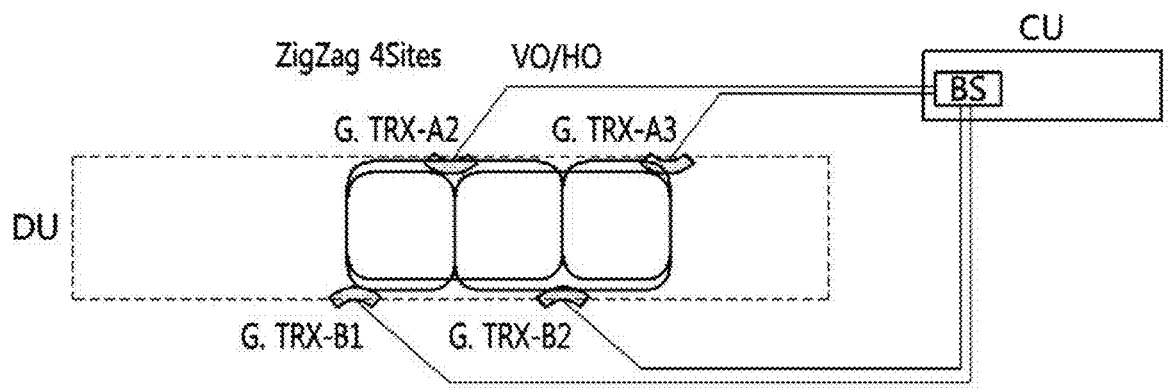
FIGS. 34A and 34B are conceptual diagrams illustrating an eighth example of DU-CU mapping for an antenna assembly according to an exemplary embodiment of the present disclosure.
Figure 34B:
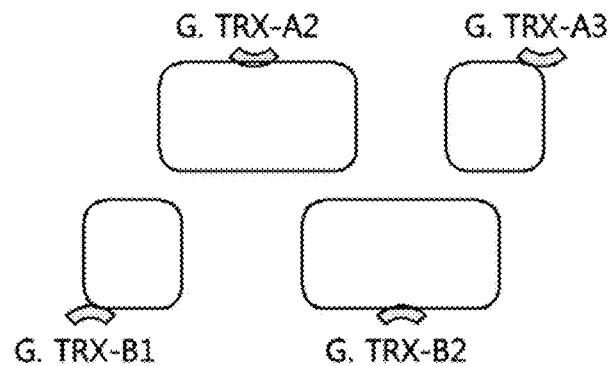

FIGS. 34A and 34B are conceptual diagrams illustrating an eighth example of DU-CU mapping for an antenna assembly according to an exemplary embodiment of the present disclosure.

Referring to FIG. 34A, two G.TRXs (i.e., G.TRX-A2 and G.TRX-A3) installed on one side (e.g., A side) of the road and two G.TRXs (i.e., G.TRX-B2 and G.TRX-B3) installed on the other side (e.g., B side) of the road may form one cell (e.g., one cell corresponding to FA1). The formed cell may be managed by one logical base station. In this case, partial beam coverage regions of G.TRX-A3 and G.TRX-B1 and the entire beam coverage regions of and G.TRX-A2 and G.TRX-B2 may be combined to be managed and operated as one cell. Referring to FIG. 34B, a shape of the beam coverage group formed by each of the four G.TRXs is illustrated.

Figure 35A:
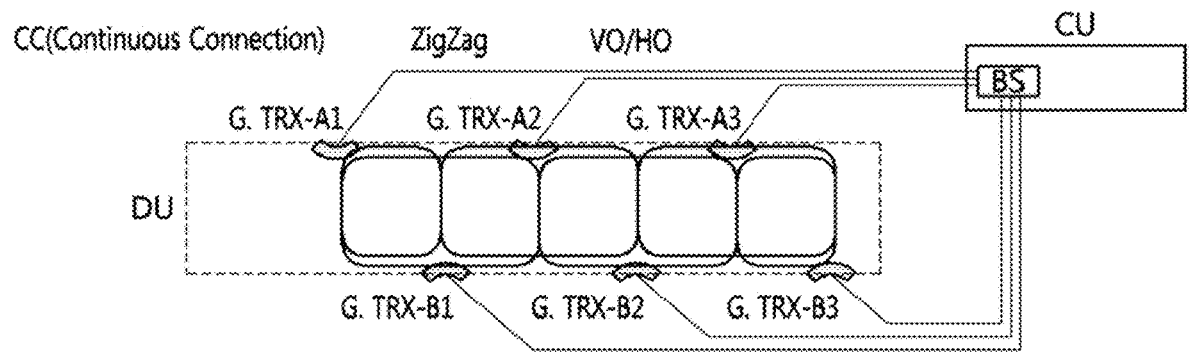
FIGS. 35A and 35B are conceptual diagrams illustrating a ninth example of DU-CU mapping for an antenna assembly according to an exemplary embodiment of the present disclosure.
Figure 35B:
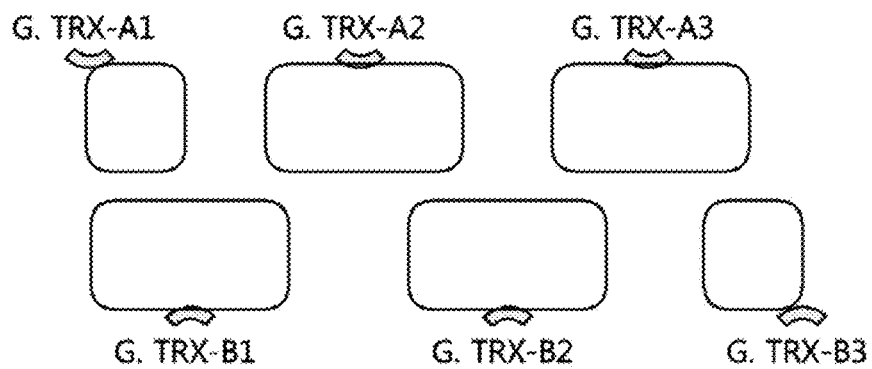

FIGS. 35A and 35B are conceptual diagrams illustrating a ninth example of DU-CU mapping for an antenna assembly according to an exemplary embodiment of the present disclosure.

In FIGS. 35A and 35B, a scheme of extending a cell region by additionally connecting G.TRXs to both sides of the road, similar to the continuous connection (CC) described above.

Referring to FIG. 35A, G.TRX-A1 and G.TRX-B3 may be additionally installed on both sides of the road, and the entire beam coverage regions of G.TRX-A2, G.TRX-A3, G.TRX-B1, and G.TRX-B2 and partial beam coverage regions of G.TRX-A1 and G.TRX-B3 may be combined to be managed and operated as one cell. Referring to FIG. 35B, a shape of the beam coverage group formed by each of the six G.TRXs is illustrated.

Cell Planning Method

Figure 36:
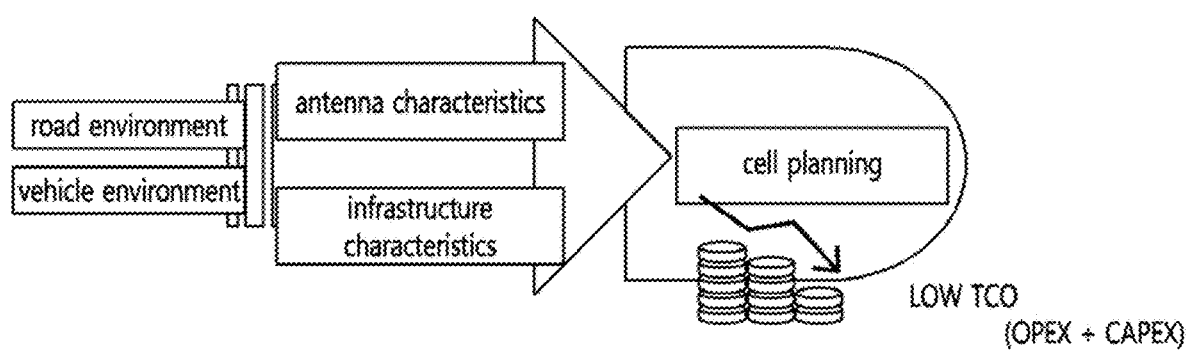
FIG. 36 is a conceptual diagram illustrating a cell planning method for a very high frequency access network according to an exemplary embodiment of the present disclosure.

FIG. 36 is a conceptual diagram illustrating a cell planning method for a very high frequency access network according to an exemplary embodiment of the present disclosure.

For the very high frequency access network, cell planning is required for eliminating the blocking problem, which is a disadvantage of the very high frequency, in consideration of road environments, vehicle environments, antenna characteristics, and infrastructure characteristics.

For example, as the road environments, basic information about road width and number of lanes, reduction or increase of lanes, branching or joining of lanes, open environments or temporarily closed environments such as tunnel, ecological roads, or barriers, environments where roads cross up and down, uphill or downhill roads, straight roads or curved roads, and deployment states of existing infrastructure such as absence or presence of street-lights and whether to utilize them may be considered.

Once the road environment that is a target of cell planning is determined, various vehicle environments may be considered. The vehicle environment may be defined as a characteristic of a vehicle to be driven on the road environment that is the target of cell planning. For example, the characteristic of the vehicle to be driven may include a height, a length, and a width of the vehicle and position information of an antenna in the vehicle. Further, the vehicle environment may include a driving environment of the vehicle. For example, the driving environment may be defined as hundreds of vehicle driving environment models on how many vehicles are distributed and various speeds of the vehicles. Such the vehicle driving environment models may be generated through video shooting in similar road environments.

After the road environment that is the target of cell planning is determined and the vehicle driving environment model is generated, the characteristics of the antenna assembly to be installed in the G.TRX may be considered. The characteristics of the antenna assembly may include characteristics of AEs constituting the antenna assembly, the number of AMs included in the antenna assembly, whether the weight and phase control is possible or not, whether the antenna assembly is an antenna assembly to be mounted on the G.TRX or an antenna assembly to be mounted on the vehicle, characteristics of AMs constituting the antenna assembly, installation height of the antenna assembly, installation interval of antenna assemblies, whether to install pole(s) for antenna assembly installation or whether to use existing street-lights, and the like.

Meanwhile, the infrastructure characteristics may include communication infrastructures installed at the time of construction of the road, an arrangement position of a CU when using the installed communication infrastructure, and the number of logical base stations that the CU is capable of processing.

That is, when the road environment is determined, fixed cell planning may be performed by selecting one of the various methods described above in consideration of the antenna characteristics. Further, a plurality of vehicle driving environment models generated by reflecting the vehicle environment may be simulated to determine whether predetermined criteria are satisfied. For example, the predetermined criteria may be configured as follows.

(First Criterion) Data Rate Requirements. For example, whether or not it is possible to provide a data rate of 1 Gbps for each vehicle.

(Second Criterion) Blockage occurrence rate. The blockage occurrence rate may be defined as a probability that a vehicle located in a unit area (e.g., 100 m$^2$) of the road environment that is the target of cell planning is in a blockage state for a predetermined time (e.g., 1 second). Although the target blockage occurrence rate is preferably set to 0%, it may be configured in consideration of the above-described various environments and CAPEX/OPEX.

When the above two criteria are not satisfied, the antenna characteristics such as the installation height and the installation interval of the antenna assemblies may be adjusted or the cell arrangement scheme may be reconfigured until the two criteria are satisfied. When the two criteria described above are satisfied, the determination as to whether the two criteria are satisfied may be repeated by applying another vehicle driving environment model. As described above, the determination on whether or not the criteria are satisfied, the adjustment of the antenna characteristics, and the reconfiguration of the cell arrangement scheme may be repeated, and a plurality of cell arrangement environments satisfying all vehicle driving environment models that are simulation targets may be determined. When several fixed cell arrangement environments are determined, the most optimal cell planning may be completed by selecting a cell arrangement environment having the lowest total cost of ownership (TCO) among them.

Cell Sliding

In the following description, assuming that 10 G.TRXs are installed on both sides of the road in a six-lane road environment (three downward lanes and three upward lanes), a process of sliding a cell formed by the G-TRXs through the ON/OFF control on AMs constituting the G.TRXs will be described.

FIGS. 37 to 41 are conceptual diagrams illustrating sliding of a cell formed by antenna assemblies according to an exemplary embodiment of the present disclosure.

Figure 37:
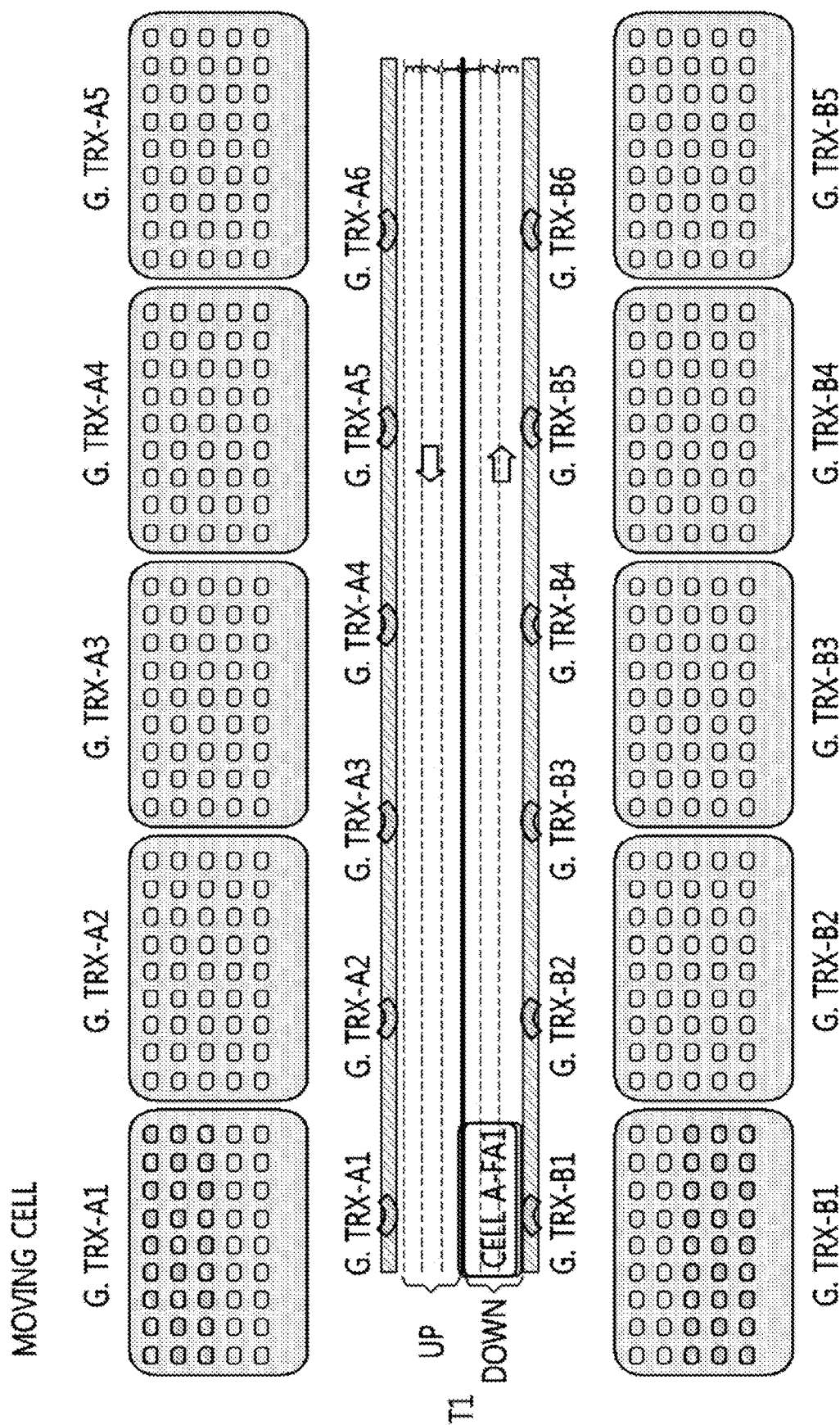
FIGS. 37 to 41 are conceptual diagrams illustrating sliding of a cell formed by antenna assemblies according to an exemplary embodiment of the present disclosure.
Figure 38:
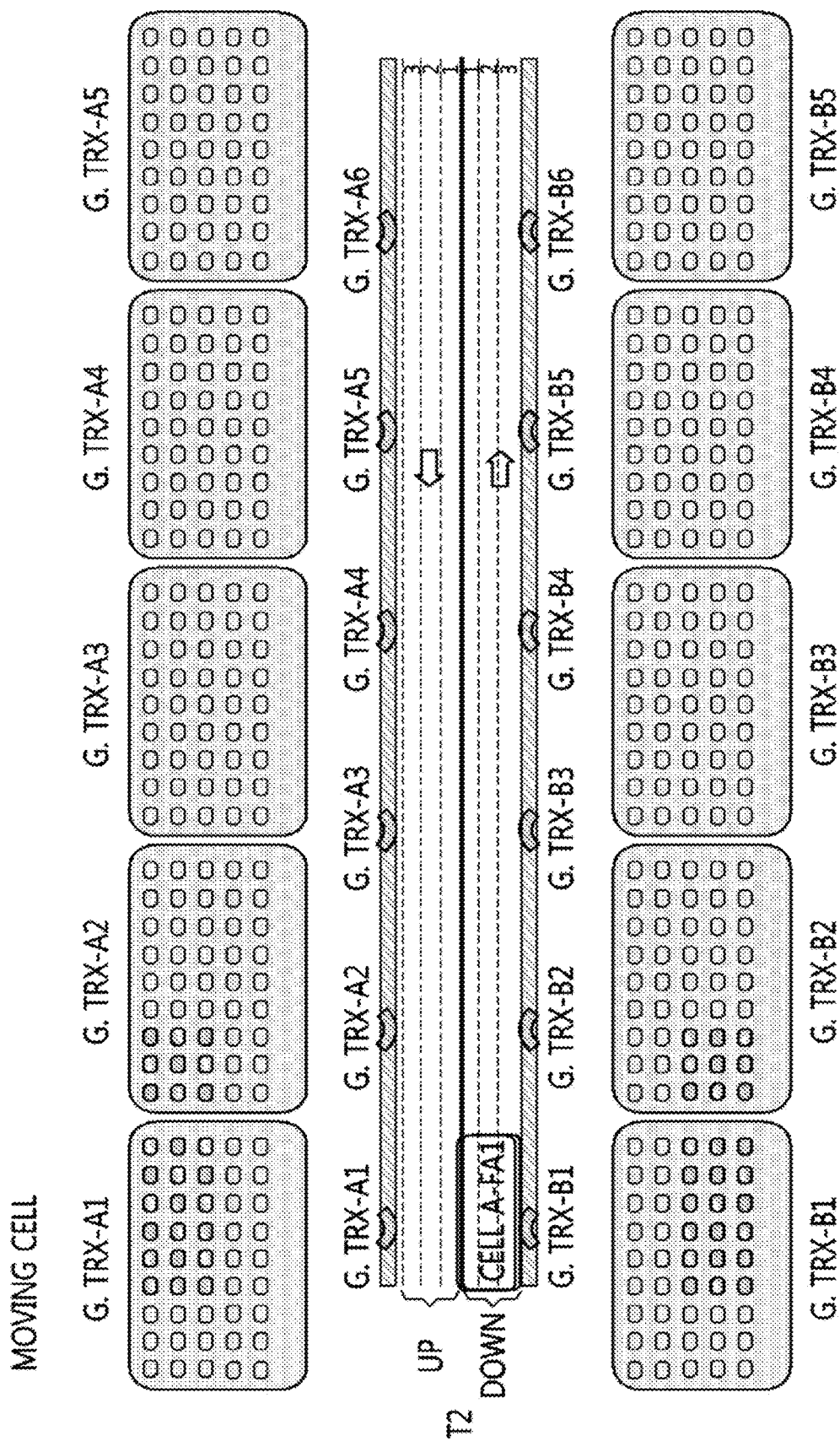
Figure 39:
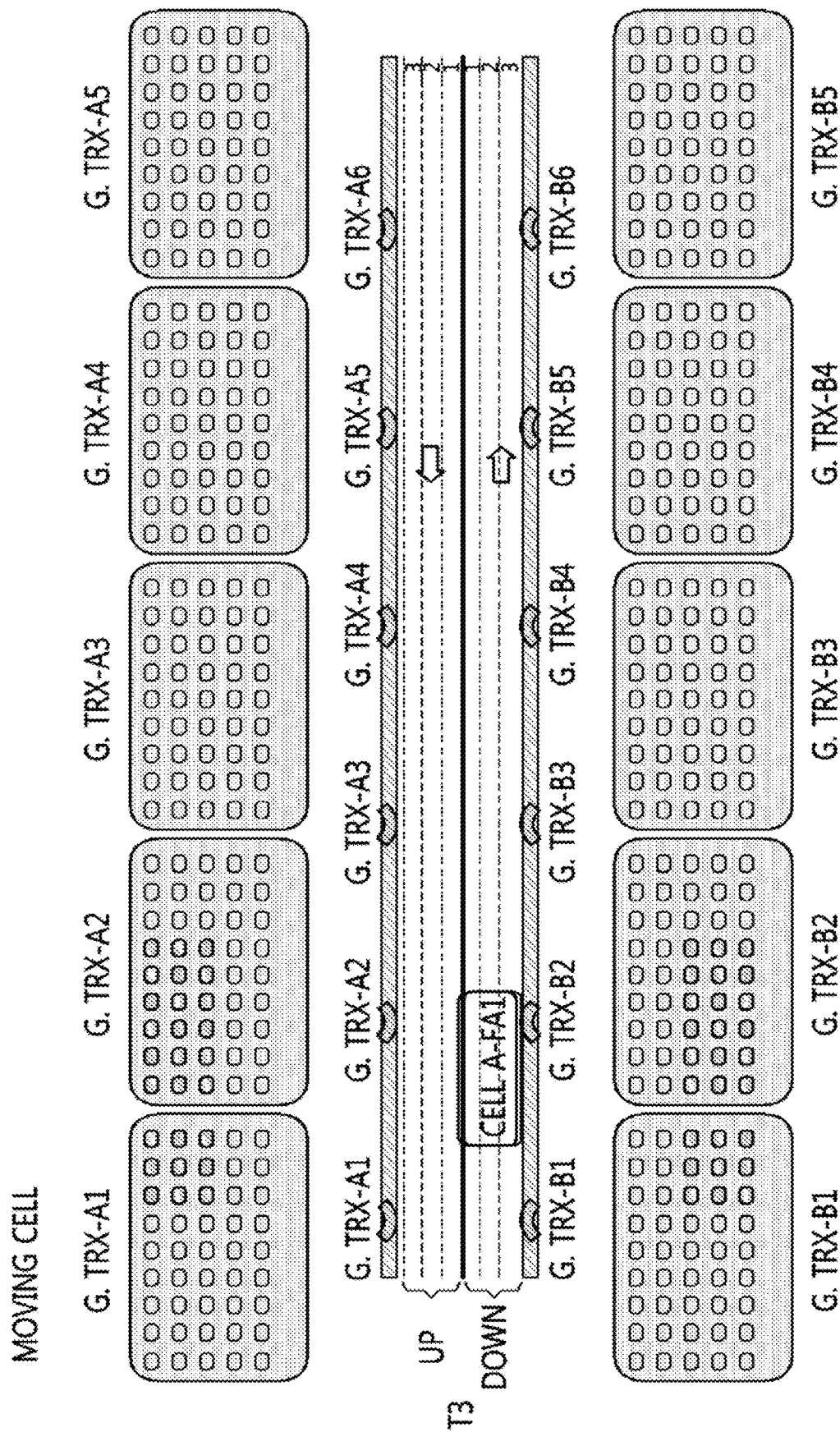
Figure 40:
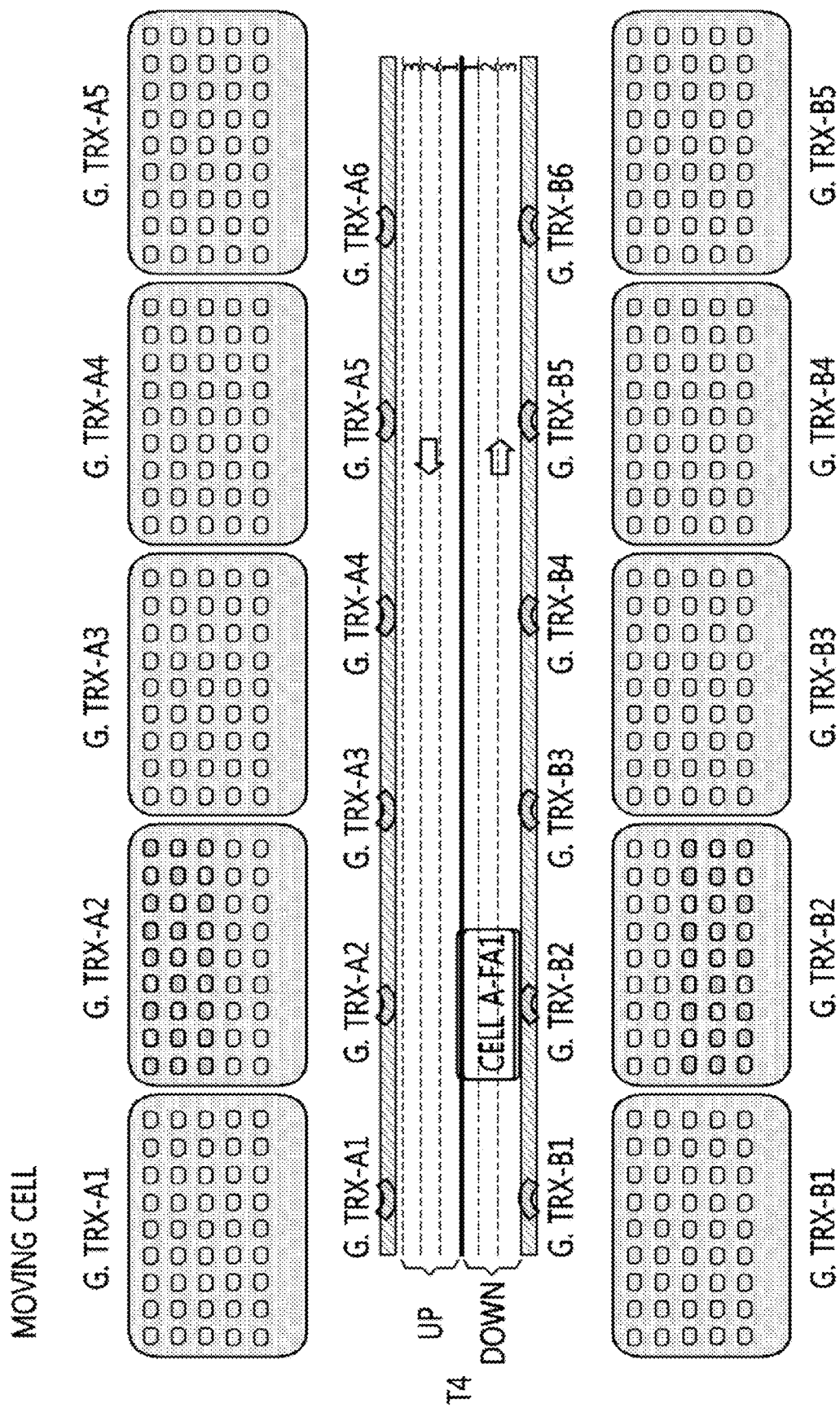
Figure 41:
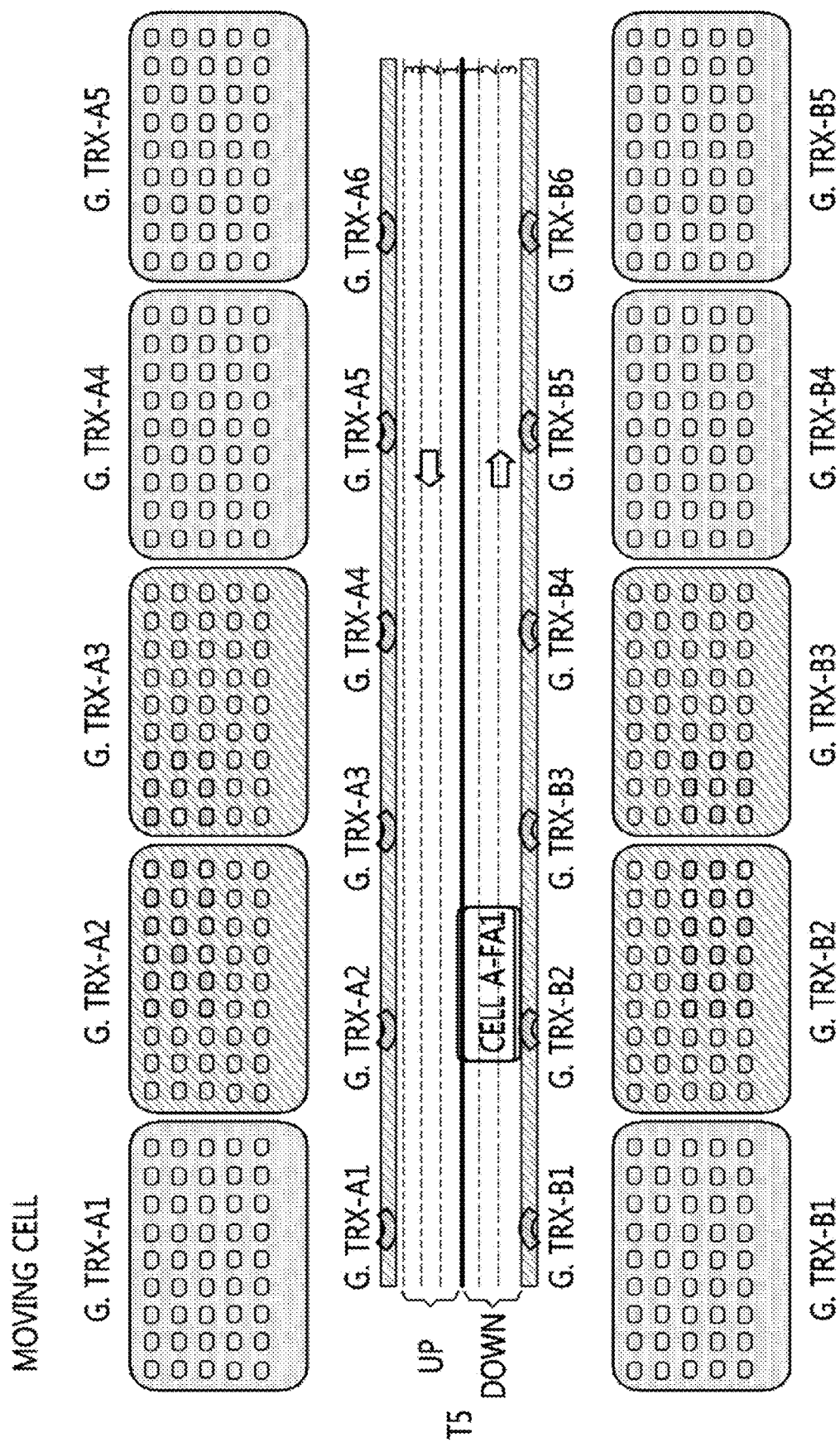

FIGS. 37 to 41 correspond to five time points T1, T2, T3, T4, and T5, respectively. For example, FIG. 37 illustrates a cell formed through ON/OFF control on the AMs at the time point T1, FIG. 38 illustrates a cell formed through ON/OFF control on the AMs at the time point T2, FIG. 39 illustrates a cell formed through ON/OFF control on the AMs at the time point T3, FIG. 40 illustrates a cell formed through ON/OFF control on the AMs at the time point T4, and FIG. 41 illustrates a cell formed through ON/OFF control on the AMs at the time point T5.

Referring to FIG. 37, for three downward lanes, CELL A corresponding to FA1 may be formed at the time point T1 by a partial beam coverage region formed by 27 AMs of the first to third rows of G.TRX-A1 and a partial beam coverage region formed by 27 AMs of the third to fifth rows of G.TRX-B1.

Referring to FIG. 38, for three downward lanes, CELL A corresponding to FA1 may be formed at the time point T2 by a partial beam coverage region formed by 18 AMs of the fourth to ninth columns of the first to third rows of G.TRX-A1, a partial beam coverage region formed by 9 AMs of the first to third columns of the first to third rows of G.TRX-A2, a partial beam coverage region formed by 18 AMs of the fourth to ninth columns of the third to fifth rows of G.TRX-B1, and a partial beam coverage region formed by 9 AMs of the first to third columns of the third to fifth rows of G.TRX-B2.

Referring to FIG. 39, for three downward lanes, CELL A corresponding to FA1 may be formed at the time point T3 by a partial beam coverage region formed by 9 AMs of the seventh to ninth columns of the first to third rows of G.TRX-A1, a partial beam coverage region formed by 18 AMs of the first to sixth columns of the first to third rows of G.TRX-A2, a partial beam coverage region formed by 9 AMs of the seventh to ninth columns of the third to fifth rows of G.TRX-B1, and a partial beam coverage region formed by 18 AMs of the first to sixth columns of the third to fifth rows of G.TRX-B2.

Referring to FIG. 40, for three downward lanes, CELL A corresponding to FA1 may be formed at the time point T4 by a partial beam coverage region formed by 27 AMs of the first to ninth columns of the first to third rows of G.TRX-A2 and a partial beam coverage region formed by 27 AMs of the first to ninth columns of the third to fifth rows of G.TRX-B1.

Referring to FIG. 41, for three downward lanes, CELL A corresponding to FA1 may be formed at the time point T5 by a partial beam coverage region formed by 18 AMs of the fourth to ninth columns of the first to third rows of G.TRX-A2, a partial beam coverage region formed by 9 AMs of the first to third columns of the first to third rows of G.TRX-A3, a partial beam coverage region formed by 18 AMs of the fourth to ninth columns of the third to fifth rows of G.TRX-B2, and a partial beam coverage region formed by 9 AMs of the first to third columns of the third to fifth rows of G.TRX-B3.

In conclusion, referring to FIGS. 37 to 41, it may be confirmed that according to the elapse of time (from the time point T1 to the time point T5), CELL A of FA1 is moving as not fixed. That is, in this manner, the cell formed by the various cell formation methods described above may be moved.

Figure 42:
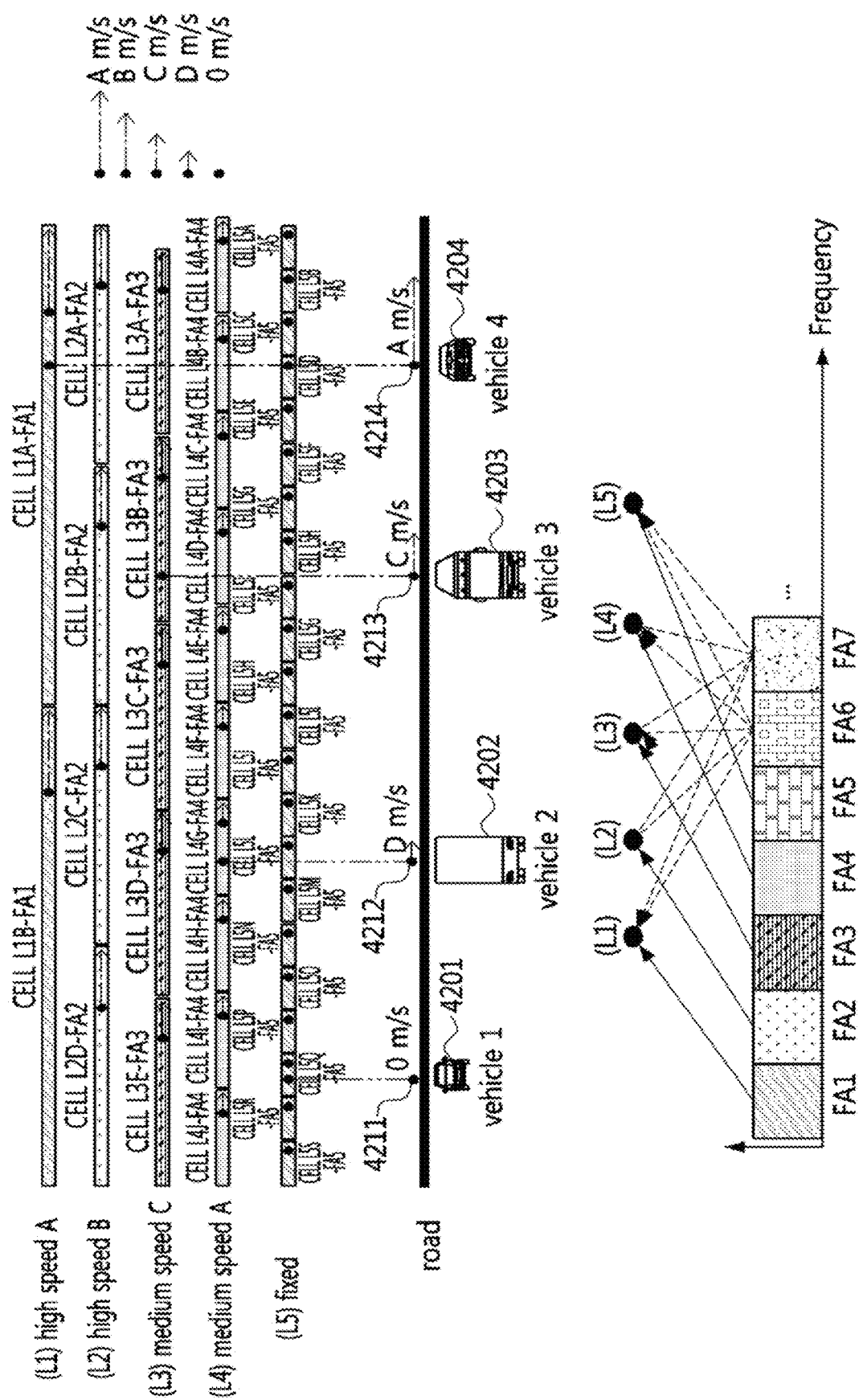
FIG. 42 is a conceptual diagram illustrating operation of moving cells according to an exemplary embodiment of the present disclosure.

FIG. 42 is a conceptual diagram illustrating operation of moving cells according to an exemplary embodiment of the present disclosure.

Referring to FIG. 42, available frequency bands may be divided into various subbands such as FA1, FA2, FA3, FA4, FA5, FA6, FA7, and the like. There may be at least one cell for each layer among multiple layers (i.e., L1 through L5), and the at least one cell may move in the manner described above with reference to FIGS. 37 to 41. Here, the layer may be determined according to a moving speed of the corresponding cell. The lower the layer, the faster the corresponding cell moves, and the higher the layer, the slower the cell moves. In this case, the L5 layer means a fixed cell without movement. The moving speeds of these cells may be assumed to be A m/s in L1, B m/s in L2, C m/s in L3, D m/s in L4, and 0 m/s in L5 layer (no movement). These layers (high speed A L1 layer, high speed B L2 layer, medium speed C L3 layer, medium speed D L4 layer, fixed L5 layer) may be classified into smaller numbers or larger numbers. Meanwhile, FA1 is used by default for the L1 layer, FA2 is used by default for the L2 layer, FA3 is used by default for the L3 layer, FA4 is used by default for the L4 layer, and FA5 is used by default for the L5 layer.

In FIG. 42, the faster the movement of the cell, the larger the coverage region of the cell is set, and the slower the movement of the cell, the smaller the coverage region of the cell is set. Therefore, the high speed vehicles can reliably use the same resources as much as possible.

In the L1 layer, CELL L1A-FA1 and CELL L1B-FA1 may be configured continuously, and these cells are moving to the right at A m/s. In the L2 layer, CELL L2A-FA2, CELL L2B-FA2, CELL L2C-FA2, and CELL L2D-FA2 may be configured continuously, and these cells are moving to the right at B m/s. In the L3 layer, CELL L3A-FA3, CELL L3B-FA3, CELL L3C-FA3, CELL L3D-FA3, and CELL L3E-FA3 may be configured continuously, and these cells are moving to the right at C m/s. In the L4 layer, CELL L4A-FA4, CELL L4B-FA4, CELL L4C-FA4, CELL L4D-FA4, CELL L4E-FA4, CELL L4F-FA4, CELL L4G-FA4, CELL L4H-FA4, CELL L41-FA4, and CELL L4J-FA4 may be configured continuously, and these cells are moving to the right at D m/s. Meanwhile, in the L5 layer, a total of 22 cells from CELL L5A-FA5 to CELL L5S-FA5 may be fixedly configured.

In the hierarchical moving cell environment illustrated in FIG. 42, if a first vehicle 4201 is stopped at a point 4211 on the road due to a breakdown or the like, the first vehicle 4201 may be connected to CELL L5Q-FA5 belonging to the L5 layer L5. If a second vehicle 4202 is moving at point 4212 on the road at a speed of D m/s, the second vehicle 4202 may be connected to CELL L4G-FA4 belonging to the L4 layer. If a third vehicle 4203 is moving at point 4213 on the road at a speed of C m/s, the third vehicle 4203 may be connected to CELL L3B-FA3 belonging to the L3 layer. If a fourth vehicle 4204 is moving at point 4214 on the road at a speed of A m/s, the fourth vehicle 4204 may be connected to CELL L1A-FA1 belonging to the L1 layer. That is, a vehicle having a speed corresponding to a speed configured for each layer may be connected to a cell of the corresponding layer. For example, a vehicle traveling at a speed within a predetermined range from the speed configured for each layer may be connected to a cell of the corresponding layer. For example, when C=30 m/s, a vehicle having a speed of 25 m/s to 35 m/s may be connected to a cell of the L3 layer. The predetermined range may be set variably.

Meanwhile, when the speed of the vehicle is changed, for example, when the speed of the second vehicle 4202 is changed from D m/s to C m/s, the cell to which the second vehicle 4202 is connected may be changed from a cell of the L2 layer to a cell of the L3 layer. That is, a layer to which each vehicle is connected may vary according to a current traveling speed of the each vehicle.

As described above, each layer may be assigned one unit subband (i.e., FA). That is, FA1 may be assigned to the L1 layer, FA2 may be assigned to the L2 layer, FA3 may be assigned to the L3 layer, FA4 may be assigned to the L4 layer, and FA5 may be assigned to the L5 layer. However, when the number of vehicles that need to be connected to a specific cell increases, some or all of the extra other unit subbands FA6, FA7, FA8, FA9, FA10, and the like may be aggregated in the corresponding cell to support the required capacity.

Figure 43:
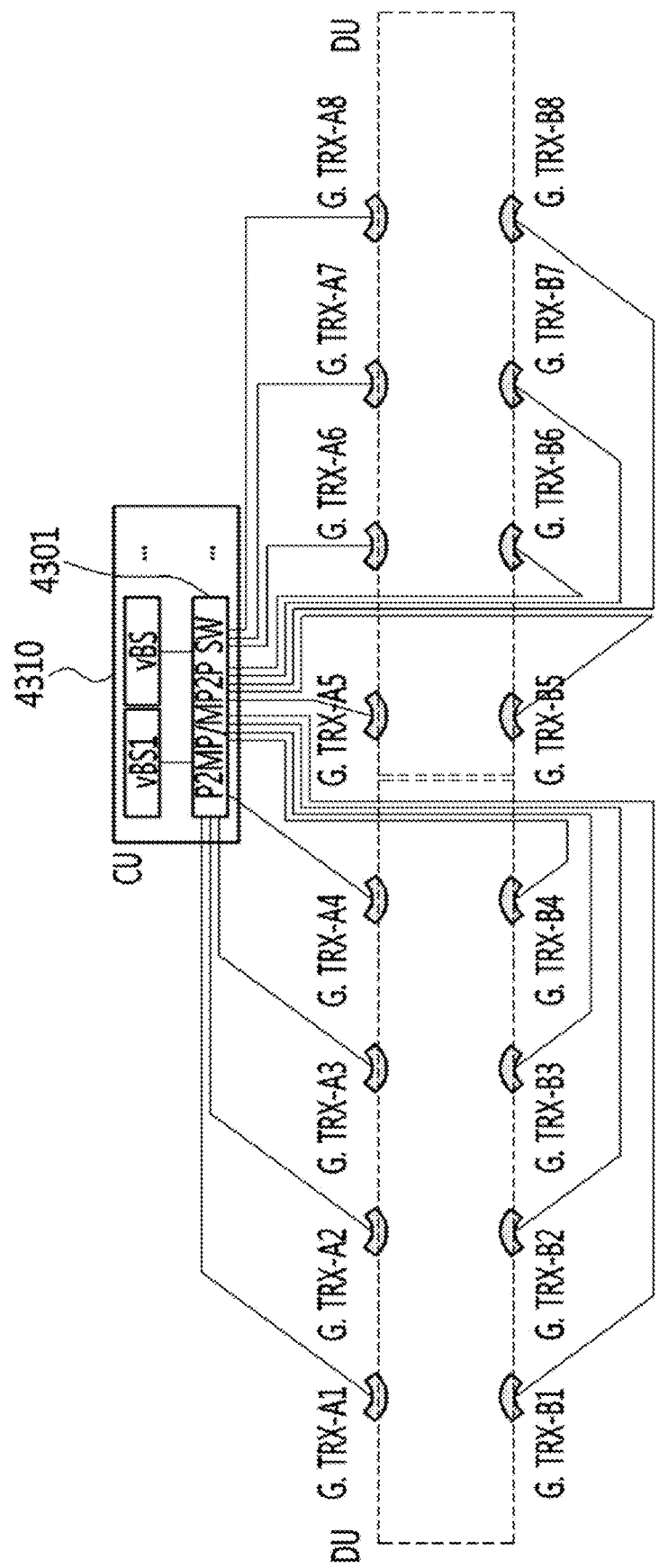
FIG. 43 is a conceptual diagram illustrating a support topology for moving cell operation according to exemplary embodiments of the present disclosure.

FIG. 43 is a conceptual diagram illustrating a support topology for moving cell operation according to exemplary embodiments of the present disclosure.

Referring to FIG. 43, a support topology for the hierarchical moving cell operation scheme of FIG. 42 is illustrated. For example, one CU 4310 may manage a total of 16 G.TRXs including eight G.TRXs (i.e., G.TRX-A1 to G.TRX-A8) installed on one side (e.g., A side) of the road and eight G.TRXs (i.e., G.TRX-B1 to G.TRX-B8) installed on the other side (e.g., B side) of the road. However, the one CU 4310 may also be configured to manage more G.TRXs.

In FIG. 43, 16 G.TRXs may be connected to the CU 4310 through a point-to-multipoint (P2MP)/multipoint-to-point (MP2P) switch 4301. In FIG. 43, the P2MP/MP2P switch 4301 is illustrated as a component included in the CU 4310, but the P2MP/MP2P switch 4301 may be located outside the CU 4310. When the P2MP/MP2P switch 4301 is included in the CU 4310, the P2MP/MP2P switch 4301 may be connected to at least one virtual base station (e.g., vBS1 and vBS2) in the CU 4310.

The P2MP/MP2P switch 4301 may transmit one downlink signal to the 16 G.TRXs simultaneously. In addition, the P2MP/MP2P switch 4301 may perform soft combining on some or all of signals received from the 16 G.TRXs, and transfer the combined signals to the CU 4310 (or, the virtual base station within the CU 4310). Alternatively, the P2MP/MP2P switch 4301 may select the best signal among the signals received from the 16 G.TRXs, and transfer the selected signal to the CU 4310 (or, the virtual base station within the CU 4310).

The first virtual base station vBS1 located in the CU 4310 may manage G.TRX-A1 to G.TRX-A4 and G.TRX-B1 to G.TRX-B4 at a certain time point through the P2MP/MP2P switch 4301. Simultaneously, the second virtual base station vBS2 located in the CU 4310 may manage G.TRX-A5 to G.TRX-A8 and G.TRX-B5 to G.TRX-B8 at the certain time point through the P2MP/MP2P switch 4301. Also, according to the movements of the cells described with reference to FIG. 42, the virtual base stations may manage different G.TRXs at different time points. Each virtual base station may manage different G.TRXs for each FA. That is, the target G.TRXs managed by the virtual base station may vary for each FA, and the virtual base stations for each FA may also be substantialized differently.

Figure 44:
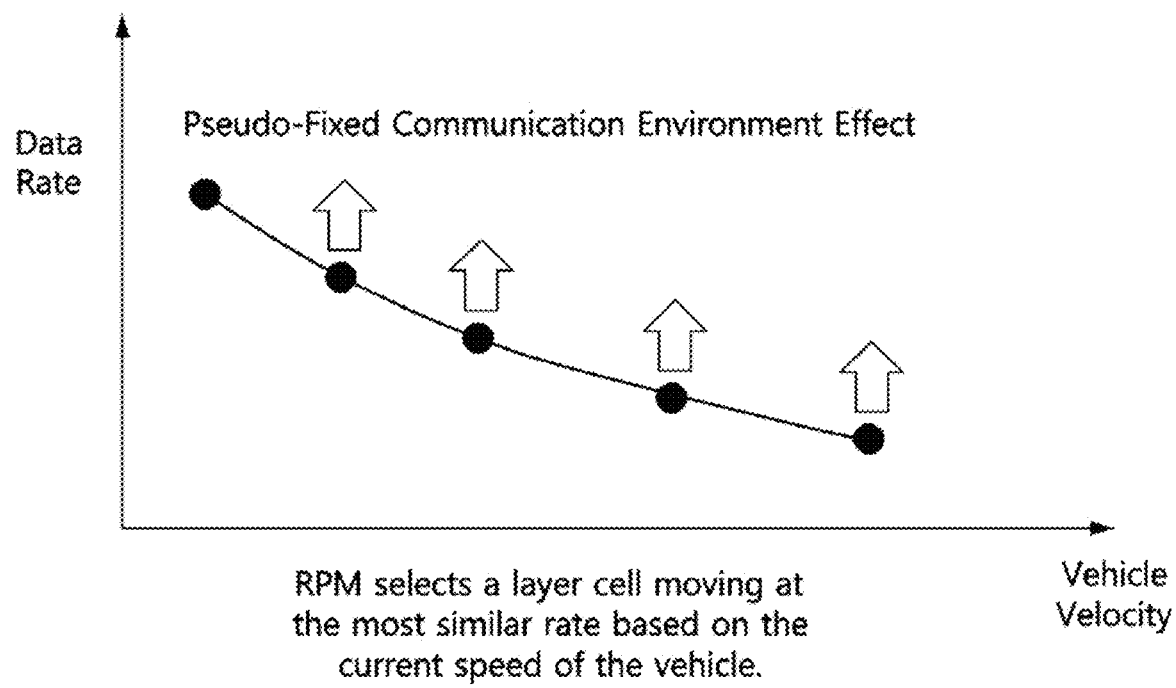
FIG. 44 is a conceptual diagram illustrating an advantage of moving cell according to exemplary embodiments of the present disclosure.

FIG. 44 is a conceptual diagram illustrating an advantage of moving cell according to exemplary embodiments of the present disclosure.

In general, performance degradation (e.g., decrease of data rate) due to the speed of the vehicle may be caused by factors such as Doppler effects or handovers. One way to mitigate such the performance degradation is to move the cell in response to the movement of the vehicle. By moving the cell, it is possible to obtain a virtual fixed communication environment, such as communicating with the cell in an environment where the vehicle does not move.

Ultimately, it is best to form and move a dedicated cell corresponding to an individual vehicle, but in this case, an accurate grasp of the position of the individual vehicle should be premised. That is, when various types of vehicles are driven at various speeds in a certain vehicle driving section and small movements such as lane changes occur individually, it is very difficult to maintain individual radio links by reflecting them, which may increase system complexity.

Therefore, in the exemplary embodiments of the present disclosure, as shown in FIG. 42, cells moving at different speeds for the respective layers may be formed. Cells formed for the respective layers may have different coverages and movement speeds. Through this, by connecting the vehicle to the cell most suitable for the position and the current speed of the vehicle, it is made possible to mitigate the performance degradation of the moving vehicle. That is, by reducing the handover occurrences on the radio link, it is made possible to prevent performance degradation due to frequent handover occurrences.

In addition, in case of a lower layer (that is, a layer of a cell moving at a low speed), the cell coverage can be reduced, thereby increasing the frequency reuse ratio and the capacity per unit area.

In addition, when a large number of vehicles are connected to a moving cell of one layer, it is made possible to continuously maintain a data rate per vehicle or improve the data rate per vehicle through carrier aggregation using available extra FAs.

FIG. 45 is a block diagram illustrating a configuration of an apparatus capable of performing a method according to exemplary embodiments of the present disclosure.

In FIG. 45, a configuration of a cell operating apparatus (e.g., a central unit (CU)) capable of performing the methods according to the exemplary embodiments of the present disclosure is illustrated. Referring to FIG. 45, a cell operating apparatus 4500 may include at least one processor 4510, a memory 4520, and a transceiver 4530 connected to an antenna assembly (e.g., distributed unit (DU)) or a P2MP/MP2P switch 4301 to perform communications. In addition, the cell operating apparatus 4500 may further include an input interface device 4540, an output interface device 4550, a storage device 4560, and the like. The components included in the cell operating apparatus 4500 may be connected by a bus 4570 to communicate with each other. However, each component included in the cell operating apparatus 4500 may be connected to the processor 4510 through a separate interface or a separate bus instead of the common bus 4570. For example, the processor 4510 may be connected to at least one of the memory 4520, the transceiver 4530, the input interface device 4540, the output interface device 4550, and the storage device 4560 through a dedicated interface.

The processor 4510 may execute at least one instruction stored in at least one of the memory 4520 and the storage device 4560. The processor 4510 may refer to a central processing unit (CPU), a graphics processing unit (GPU), or a dedicated processor on which the methods according to the exemplary embodiments of the present invention are performed. Each of the memory 4520 and the storage device 4560 may be configured as at least one of a volatile storage medium and a nonvolatile storage medium. For example, the memory 4520 may be configured with at least one of a read only memory (ROM) and a random access memory (RAM).

The at least one instruction may be configured such that the processor 4510 performs each step of the methods according to the exemplary embodiments of the present disclosure described above. All information exchanged between the apparatus 4500 and the antenna assembly or the P2MP/MP2P switch 4301 may be transmitted or received through the transceiver 4530 under the control of the processor 4510.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. A method for operating cells, performed by a central unit (CU) using at least one antenna assembly arranged around a moving path of moving objects, the method comprising:
   forming a cell for each of at least two layers by using the at least one antenna assembly, the at least two layers being configured hierarchically according to speeds; and
   moving the cell at a speed configured for a layer corresponding to the cell,
   wherein the cell is connected to a moving object having a speed corresponding to the speed configured for the layer corresponding to the cell, a first cell corresponding to a higher speed among cells of the at least two layers has a larger coverage than a coverage of a second cell corresponding to a lower speed among the cells of the at least two layers.

2. The method according to claim 1, wherein each of the at least one antenna assembly operates as a distributed unit (DU).

3. The method according to claim 1, wherein each of the at least one antenna assembly comprises a set of at least one antenna module composed of M rows and N columns, M is a natural number equal to or greater than 1, and N is a natural number equal to or greater than 1.

4. The method according to claim 3, wherein the moving of the cell is performed by selective ON/OFF control on the at least one antenna module.

5. The method according to claim 3, wherein the moving of the cell is performed by phase and weigh control on the at least one antenna module.

6. The method according to claim 1, wherein the at least one antenna assembly is connected to the CU via a point-to-multipoint (P2MP)/multipoint-to-point (MP2P) switch.

7. The method according to claim 6, wherein the P2MP/M2PM switch simultaneously transmits one downlink signal to the at least one antenna assembly, combines signals received from the at least one antenna assembly and transfers the combined signals to the CU, or selectively transfers signals received from the at least one antenna assembly to the CU.

8. A method for operating cells, performed by a central unit (CU) using at least one antenna assembly arranged around a moving path of moving objects, the method comprising:
   forming a cell for each of at least two layers by using the at least one antenna assembly;

moving the cell at a speed configured for a layer corresponding to the cell,
wherein the cell is connected to a moving object having a speed corresponding to the speed configured for the layer corresponding to the cell, a first portion of the at least one antenna assembly is installed on one side of the moving path, and a second portion of the at least one antenna assembly is installed on the other side of the moving path.

9. The method according to claim 1, wherein at least a portion of beam coverages formed by a first portion of the at least one antenna assembly vertically overlap with at least a portion of beam coverages formed by a second portion of the at least one antenna assembly.

10. The method according to claim 1, wherein at least a portion of beam coverages formed by a first portion of the at least one antenna assembly horizontally overlap with at least a portion of beam coverages formed by a second portion of the at least one antenna assembly.

11. The method according to claim 1, wherein each cell formed for each of the at least two layers is assigned a different frequency allocation (FA).

12. An apparatus for operating cells by using at least one antenna assembly arranged around a moving path of moving objects, the apparatus comprising at least one processor and a memory storing at least one instruction executable by the processor, wherein when executed by the at least one processor, the at least one instruction is configured the at least one processor to:
form a cell for each of at least two layers by using the at least one antenna assembly, the at least two layers being configured hierarchically according to speeds; and
move the cell at a speed configured for a layer corresponding to the cell,
wherein the cell is connected to a moving object having a speed corresponding to the speed configured for the layer corresponding to the cell, a first cell corresponding to a higher speed among cells of the at least two layers has a larger coverage than a coverage of a second cell corresponding to a lower speed among the cells of the at least two layers.

13. The apparatus according to claim 12, wherein each of the at least one antenna assembly operates as a distributed unit (DU).

14. The apparatus according to claim 12, wherein each of the at least one antenna assembly comprises a set of at least one antenna module composed of M rows and N columns, M is a natural number equal to or greater than 1, and N is a natural number equal to or greater than 1.

15. The apparatus according to claim 14, wherein the moving of the cell is performed by selective ON/OFF control on the at least one antenna module or phase and weigh control on the at least one antenna module.

16. The apparatus according to claim 12, wherein the at least one antenna assembly is connected to the CU via a point-to-multipoint (P2MP)/multipoint-to-point (MP2P) switch.

17. The apparatus according to claim 16, wherein the P2MP/M2PM switch simultaneously transmits one downlink signal to the at least one antenna assembly, combines signals received from the at least one antenna assembly and transfers the combined signals to the CU, or selectively transfers signals received from the at least one antenna assembly to the CU.

18. The apparatus according to claim 12, wherein a first portion of the at least one antenna assembly is installed on one side of the moving path, and a second portion of the at least one antenna assembly is installed on the other side of the moving path.

19. The apparatus according to claim 12, wherein at least a portion of beam coverages formed by a first portion of the at least one antenna assembly vertically overlap with at least a portion of beam coverages formed by a second portion of the at least one antenna assembly.

20. The apparatus according to claim 12, wherein at least a portion of beam coverages formed by a first portion of the at least one antenna assembly horizontally overlap with at least a portion of beam coverages formed by a second portion of the at least one antenna assembly.

* * * * *